(12) United States Patent
Schuster

(10) Patent No.: US 12,359,417 B2
(45) Date of Patent: Jul. 15, 2025

(54) ANCHOR BOLT SYSTEM FOR TOILET AND METHOD OF MOUNTING A TOILET USING THE SYSTEM

(71) Applicant: M3WE, Inc., Shorewood, IL (US)

(72) Inventor: Michael J. Schuster, Shorewood, IL (US)

(73) Assignee: M3WE, Inc., Shorewood, IL (US)

( * ) Notice: Subject to any disclaimer, the term of this patent is extended or adjusted under 35 U.S.C. 154(b) by 524 days.

(21) Appl. No.: 17/740,621

(22) Filed: May 10, 2022

(65) Prior Publication Data

US 2023/0366190 A1 Nov. 16, 2023

(51) Int. Cl.
*E03D 11/16* (2006.01)
*F16B 35/06* (2006.01)
*F16B 37/14* (2006.01)

(52) U.S. Cl.
CPC .............. *E03D 11/16* (2013.01); *F16B 35/06* (2013.01); *F16B 37/14* (2013.01)

(58) Field of Classification Search
CPC ....................................................... E03D 11/16
See application file for complete search history.

(56) References Cited

U.S. PATENT DOCUMENTS

| 4,464,836 | A | * | 8/1984 | Hissa | B23D 61/185 16/442 |
| 4,907,923 | A | * | 3/1990 | McGrath, Jr. | E03D 11/14 411/908 |
| 6,125,479 | A | * | 10/2000 | Fraleigh | E03D 11/16 411/401 |
| 6,155,606 | A | * | 12/2000 | Phillips | F16L 23/032 285/59 |
| 8,210,785 | B1 | * | 7/2012 | Gager | E03D 11/16 411/338 |
| 9,909,296 | B2 | * | 3/2018 | Schuster | F16B 5/0233 |

* cited by examiner

*Primary Examiner* — Janie M Loeppke
(74) *Attorney, Agent, or Firm* — Wood, Phillips, Katz, Clark & Mortimer

(57) ABSTRACT

The combination of: a closet collar having a flange; an anchor bolt having a head portion and an elongate shank with an axis and configured to be operatively connected to the closet collar; a cap support assembly that is engageable with the anchor bolt elongate shank adjacent a free end region thereof; and a cap. Cooperating components on the cap and cap support assembly are engageable to maintain the cap in assembled relationship with the cap support assembly, wherein the cap cannot be separated from the cap support assembly by exerting a force upon the cap along the axis of the elongate shank.

33 Claims, 32 Drawing Sheets

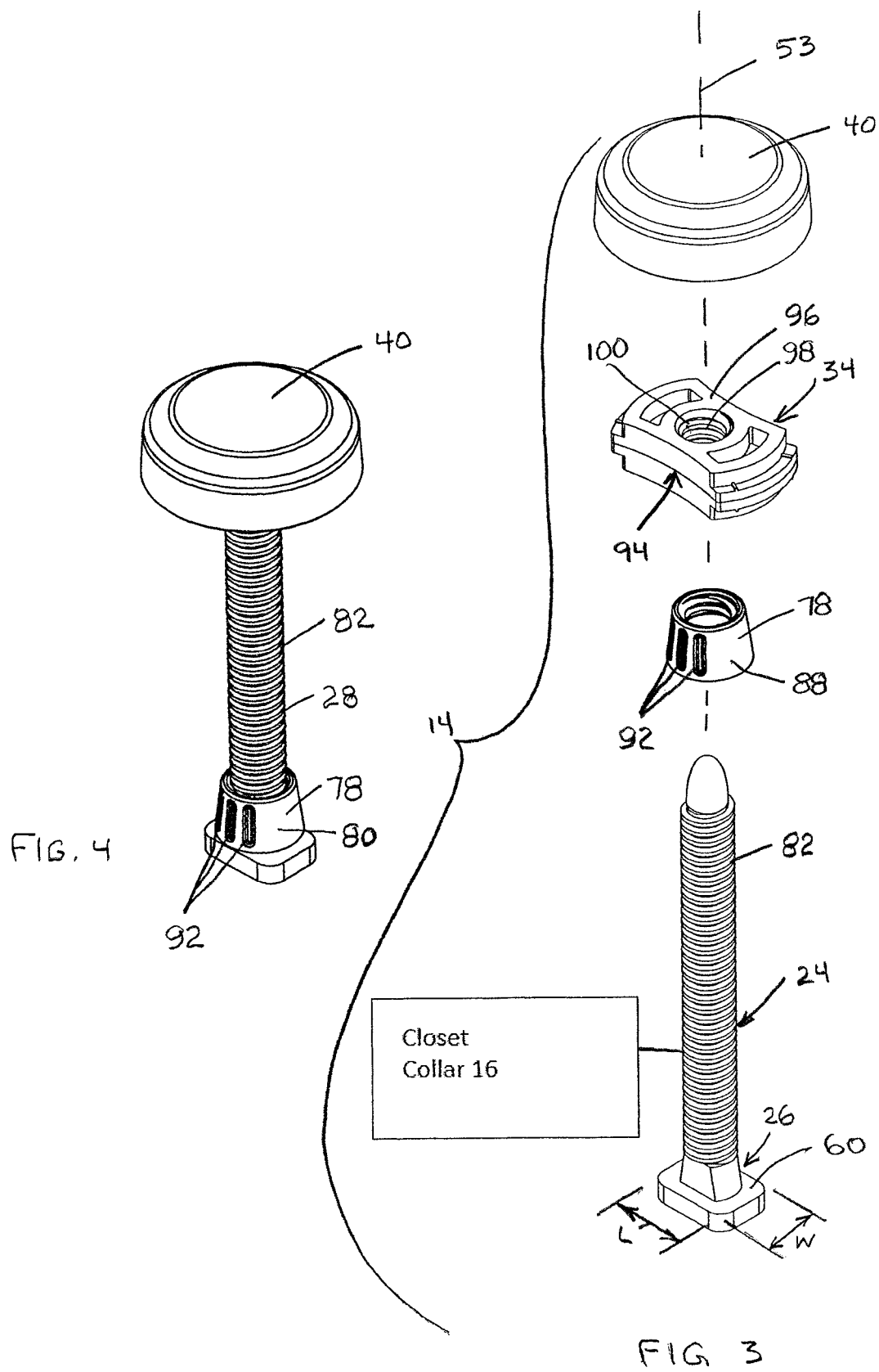

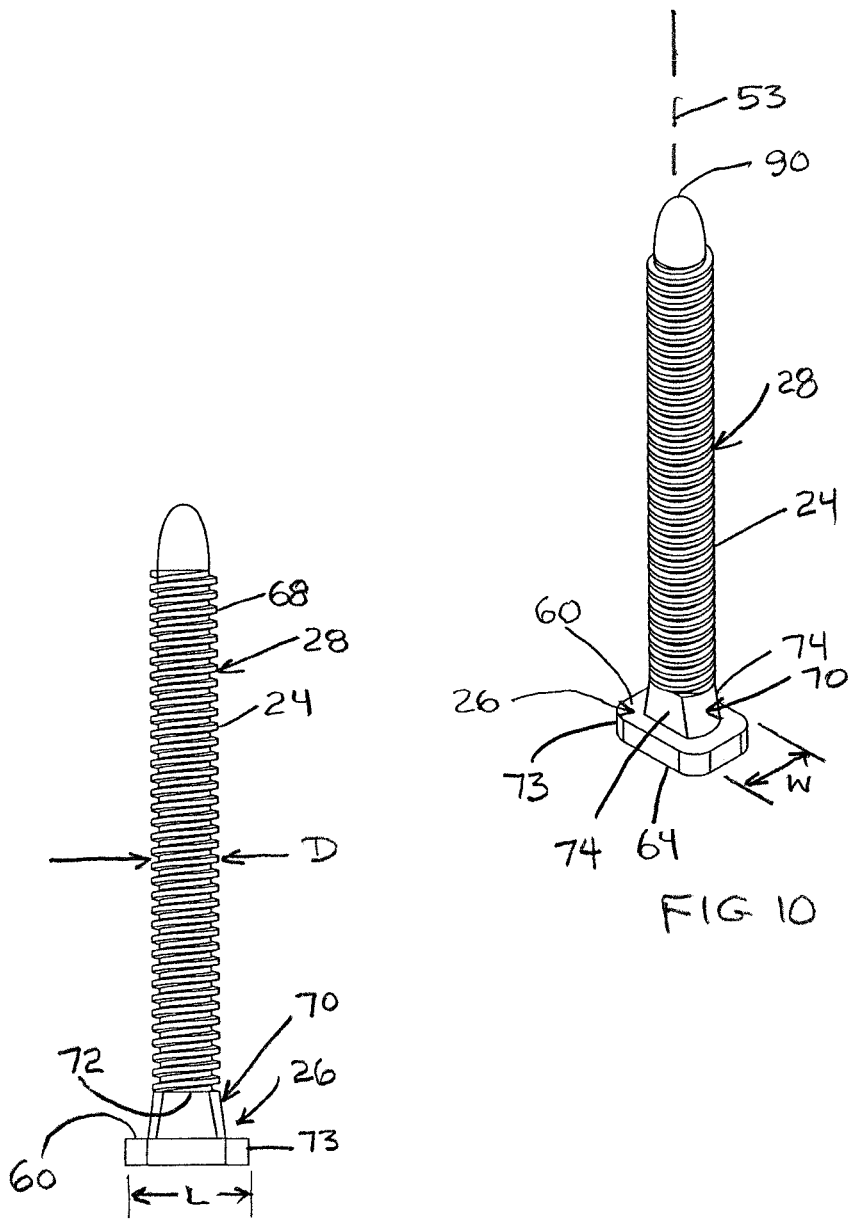

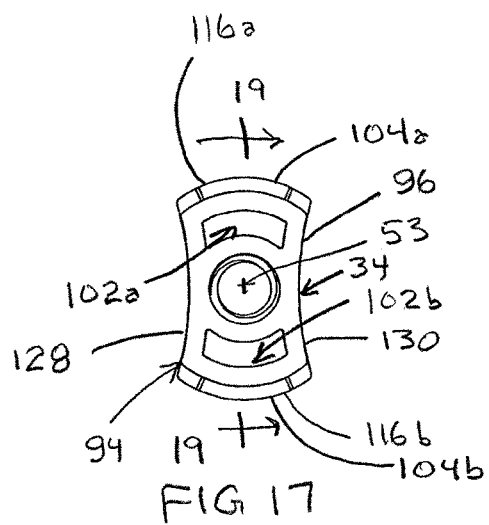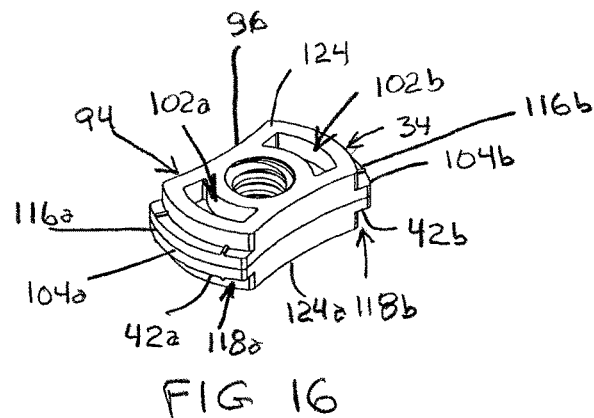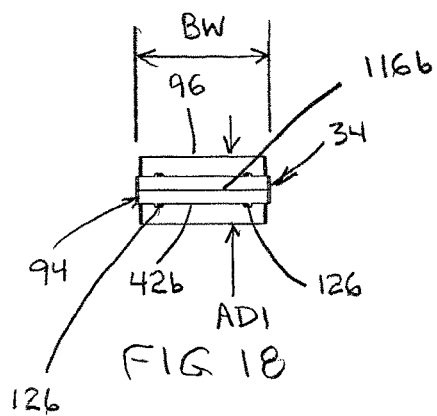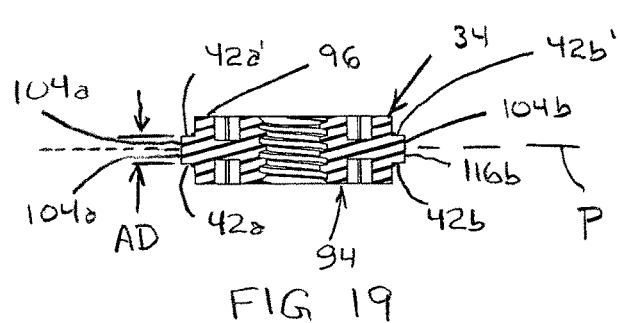

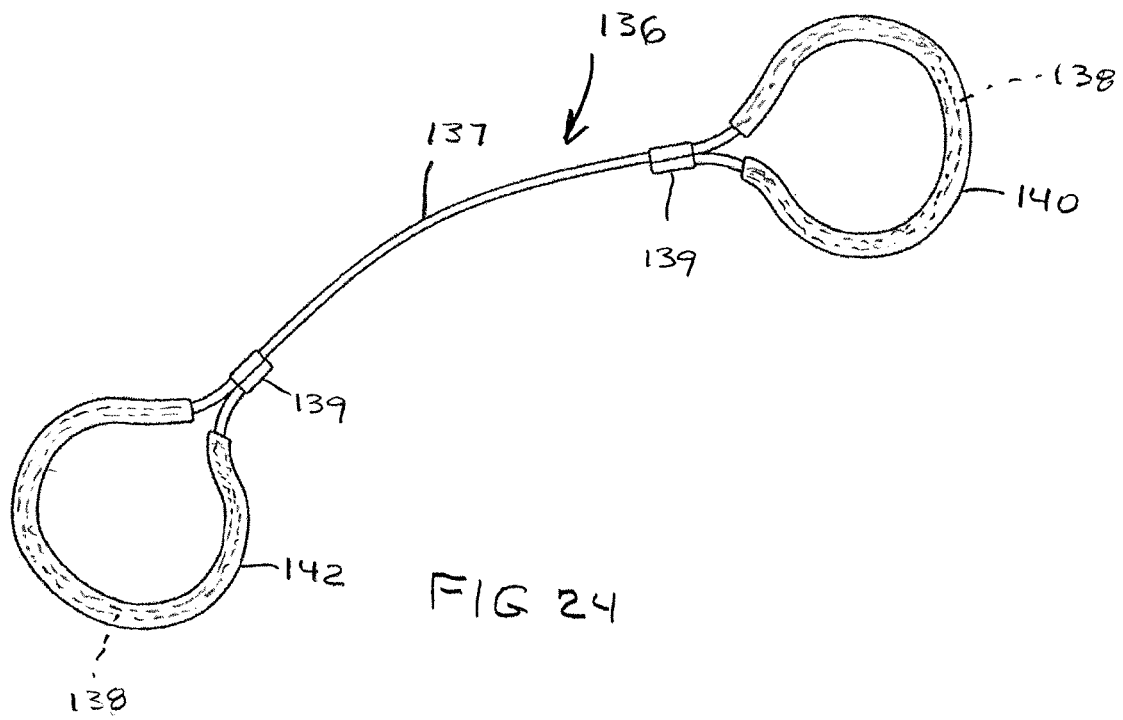
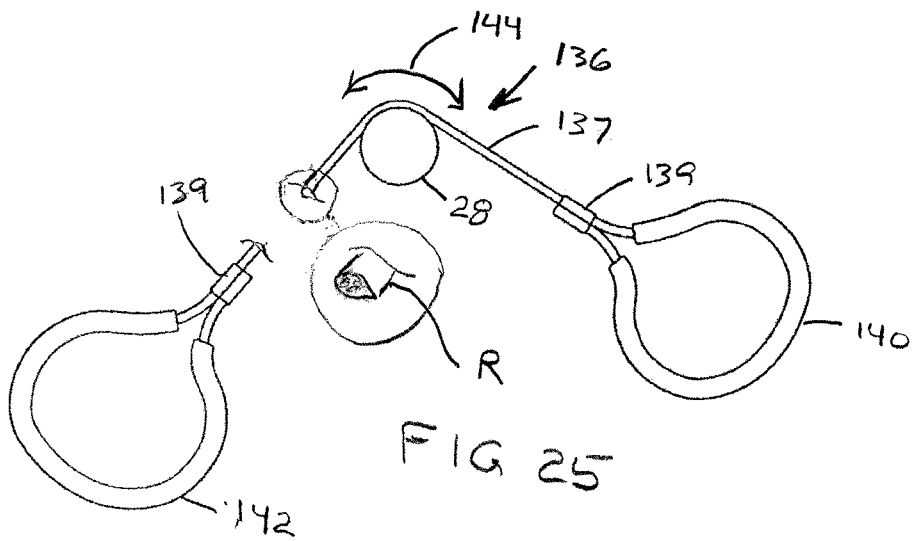

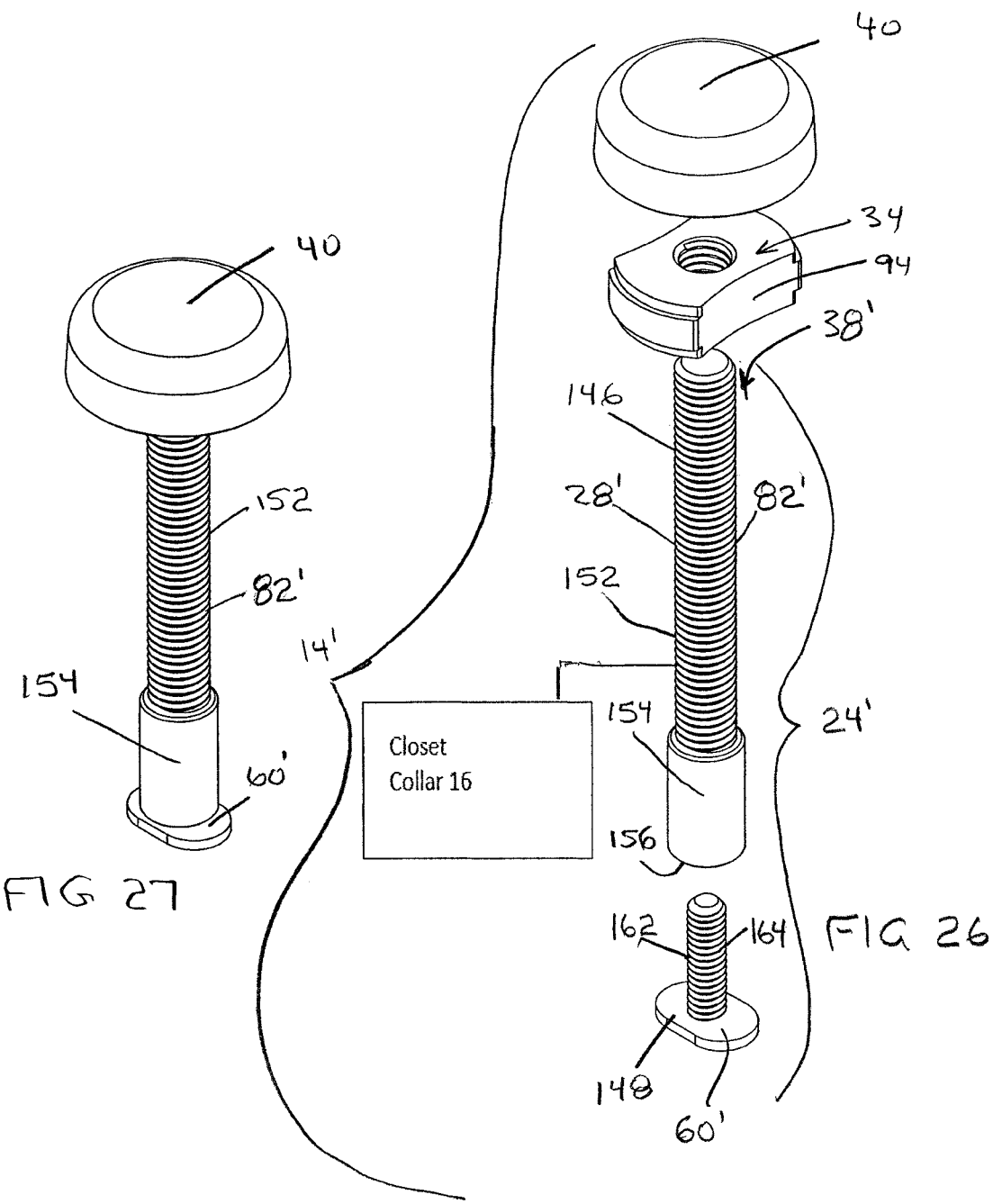

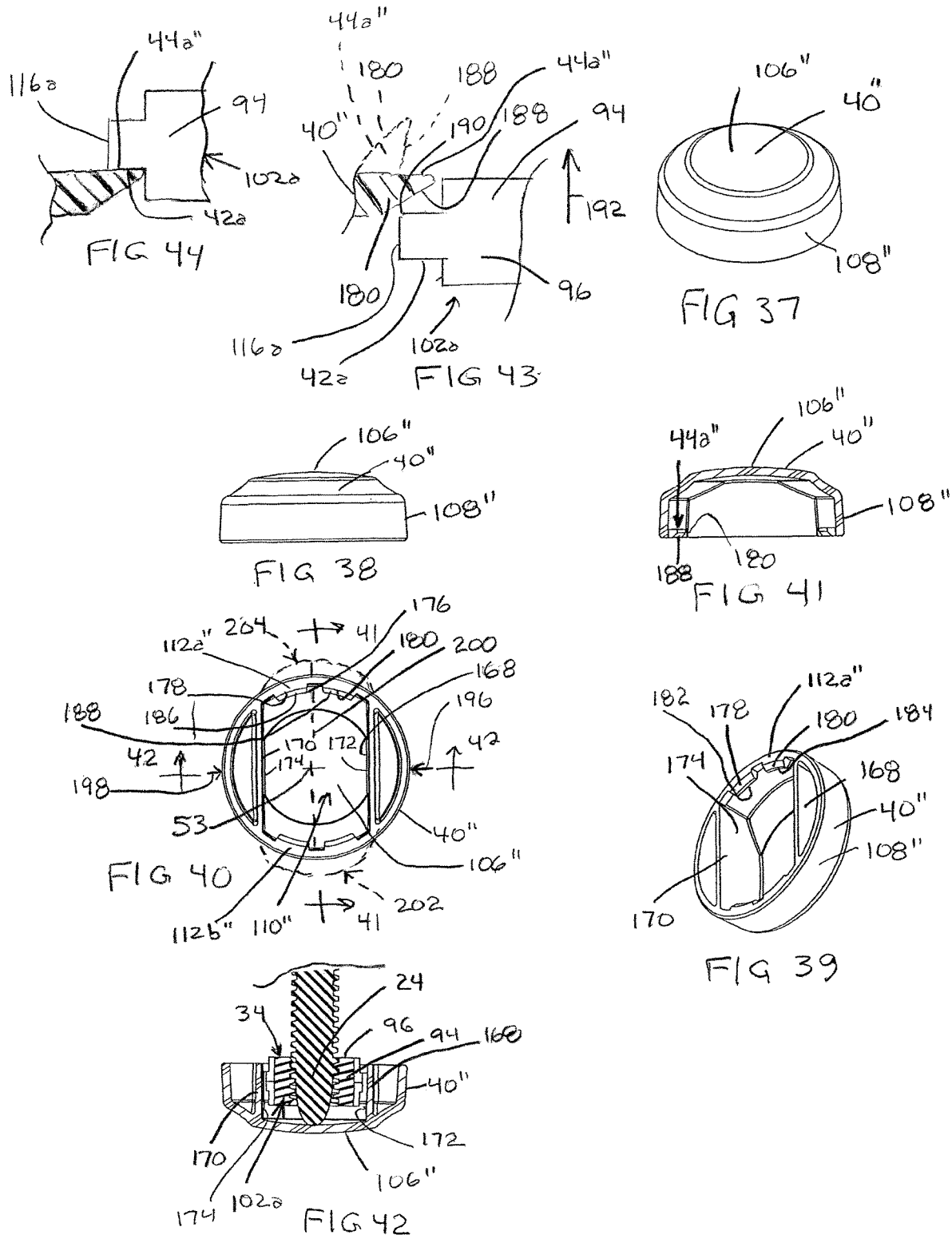

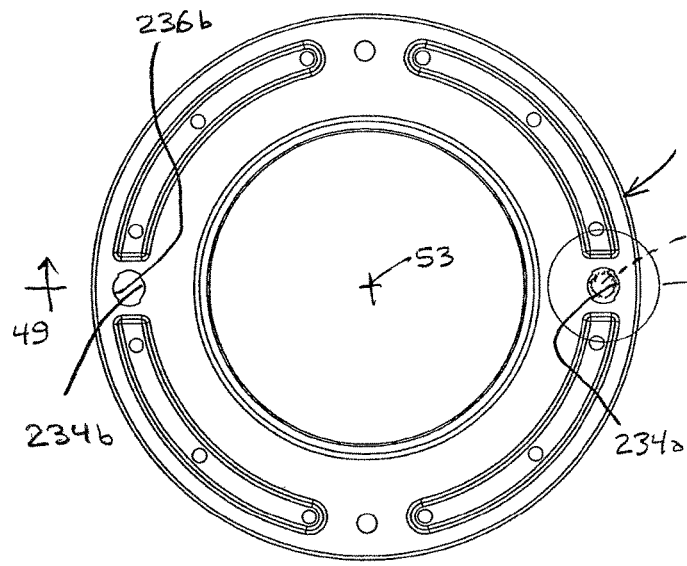
FIG 47
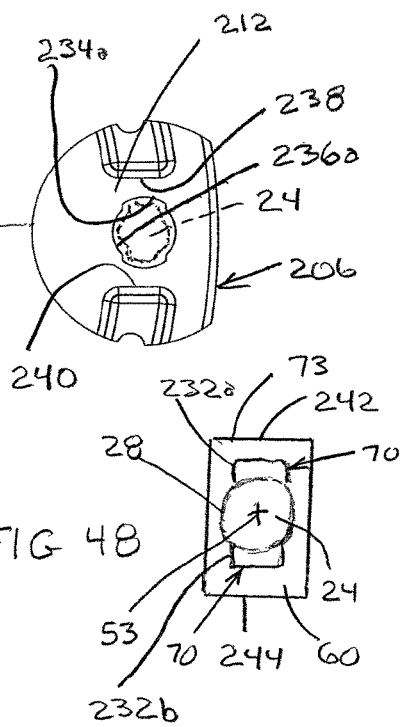
FIG 48
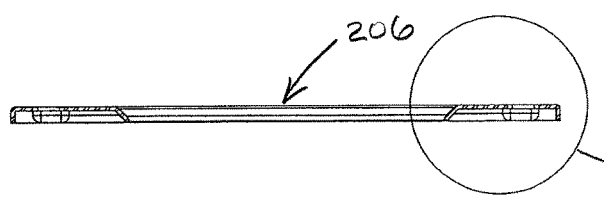
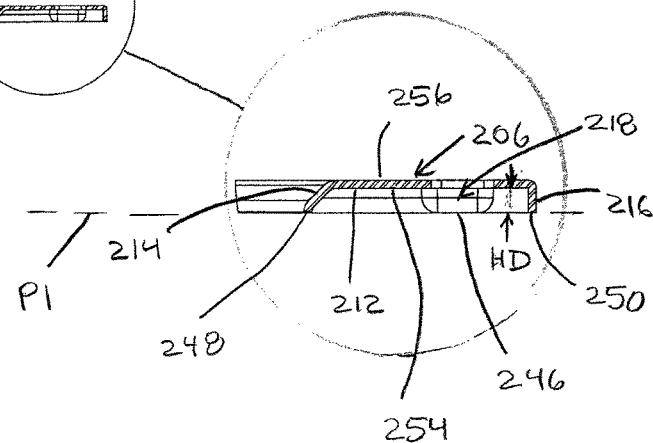
FIG 49

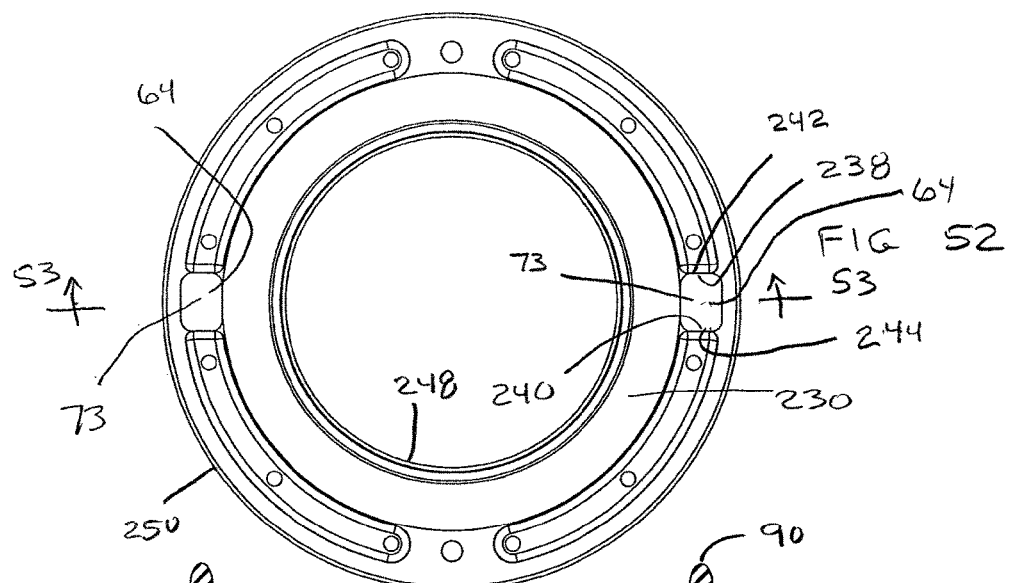
FIG 52
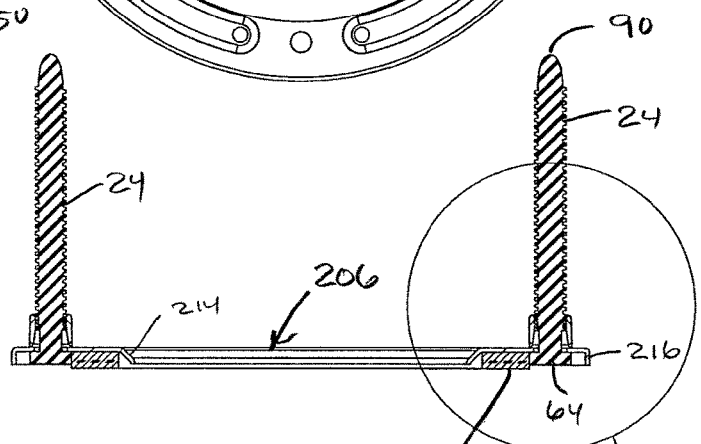
FIG 53
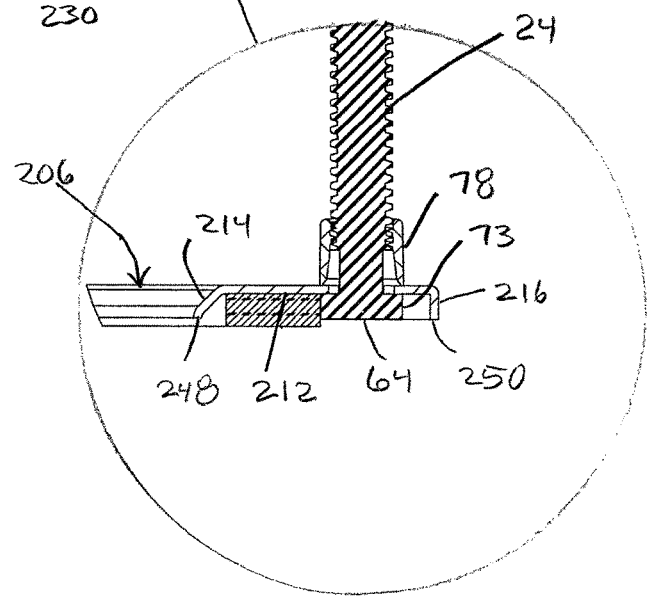

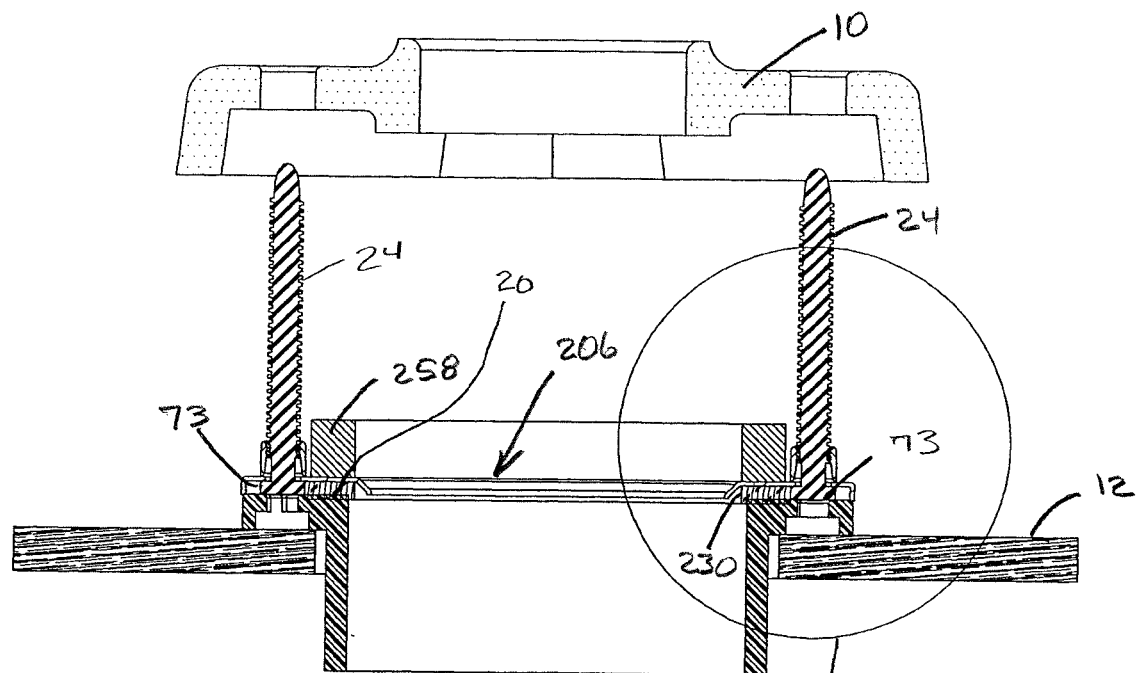
FIG 56
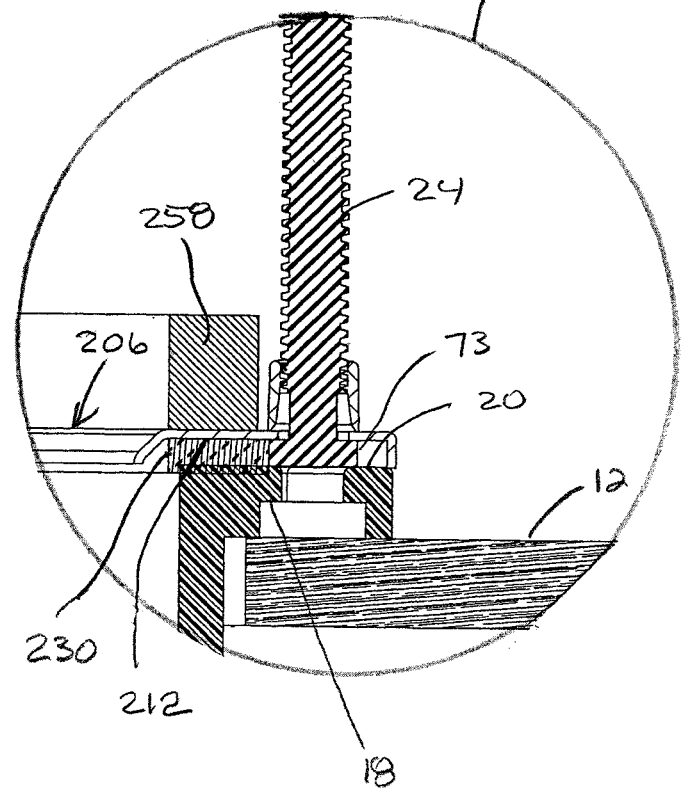

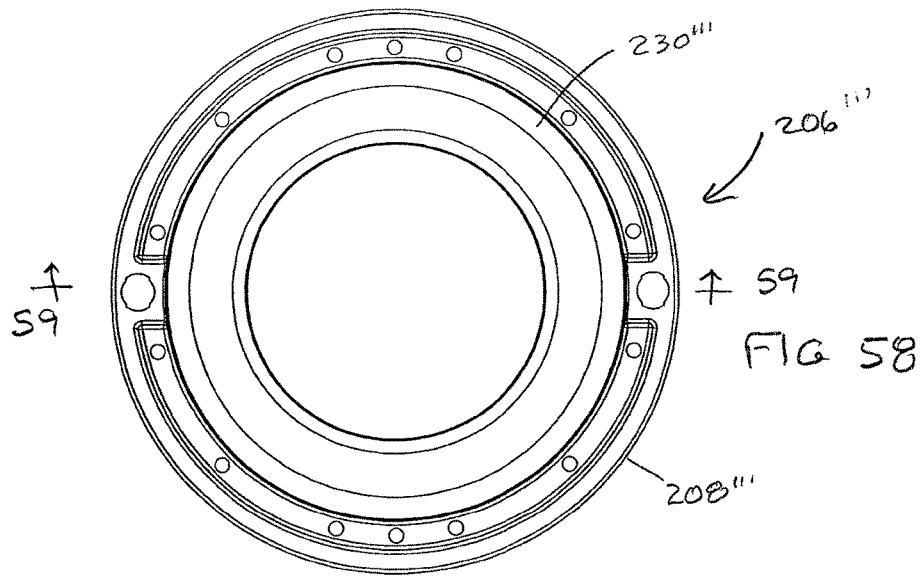
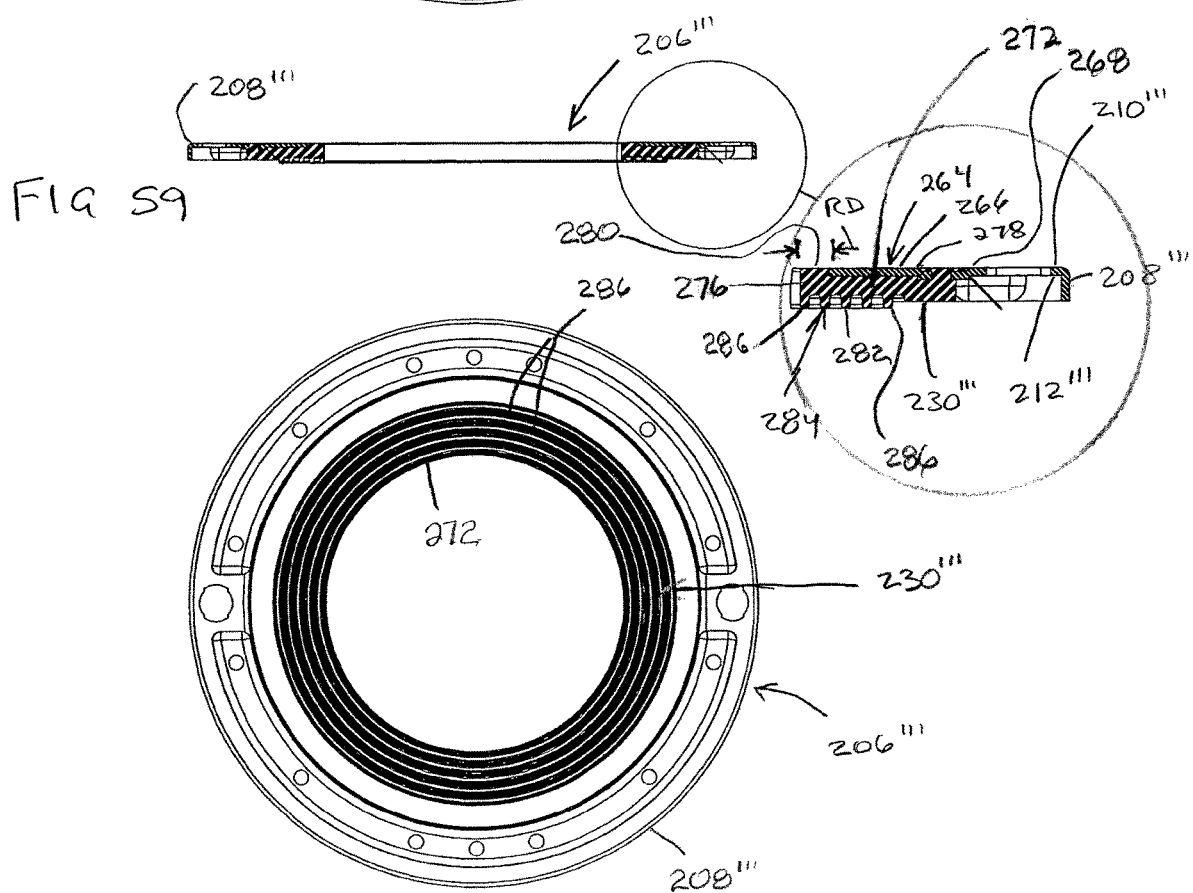
FIG 58
FIG 59
FIG 60

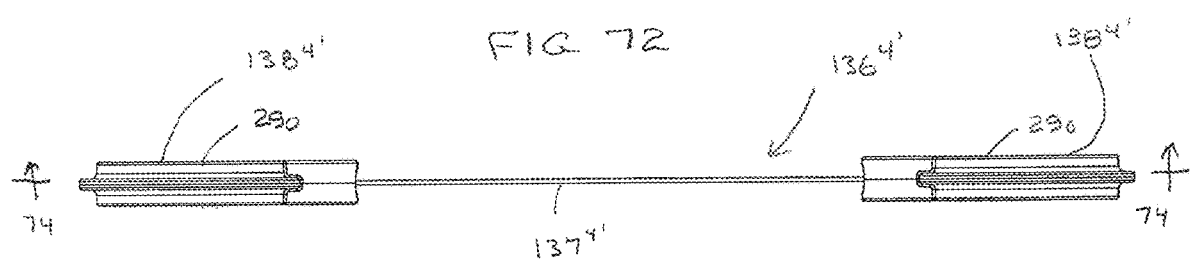
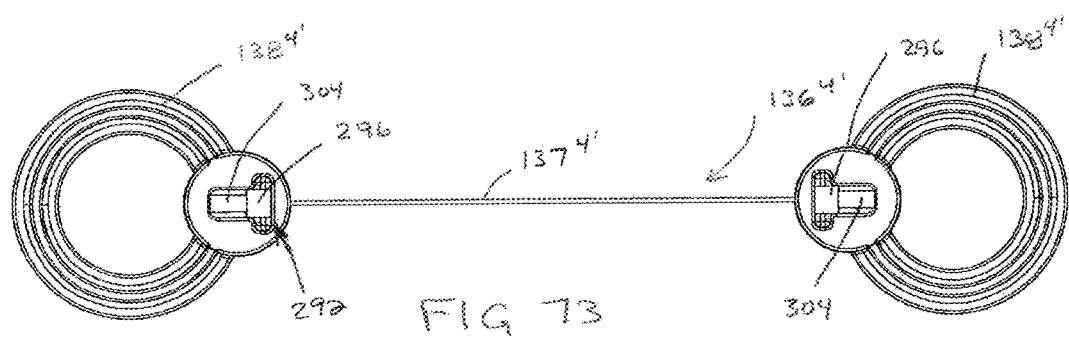

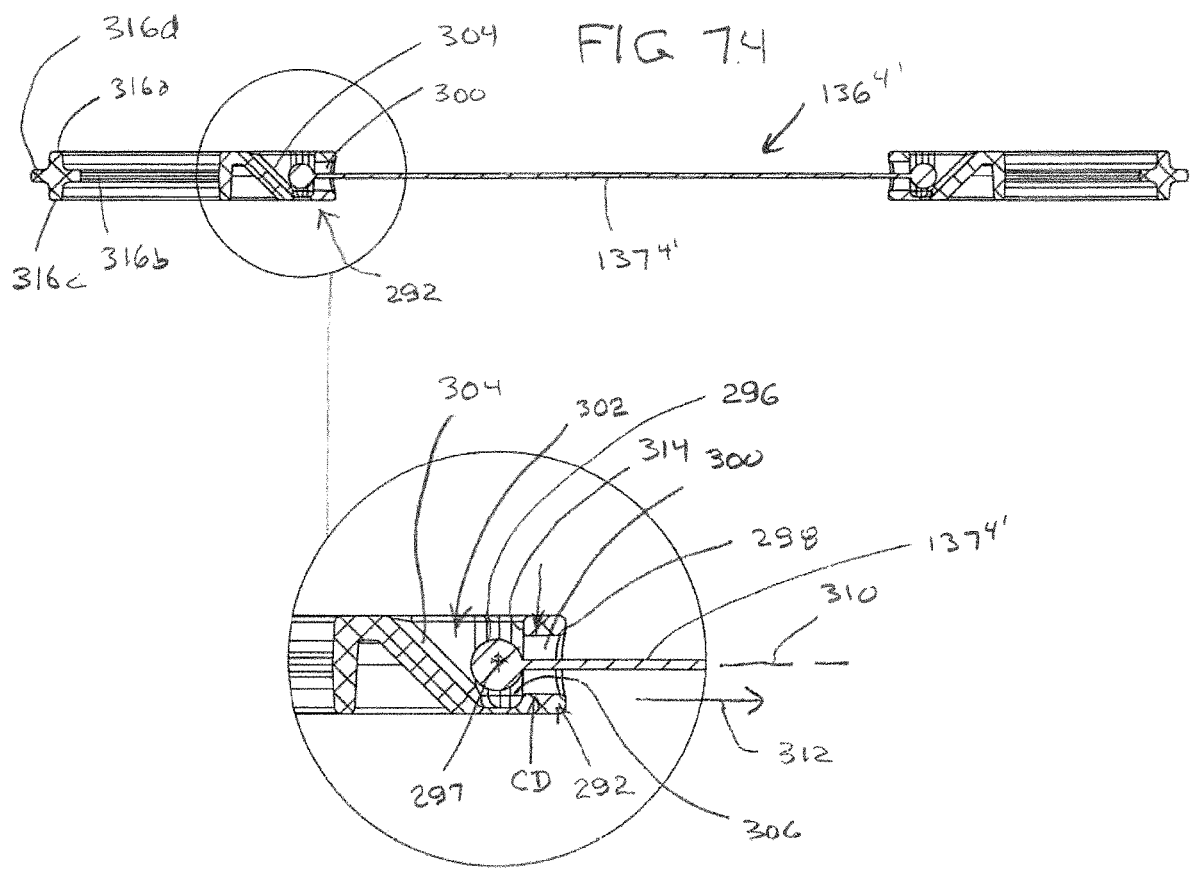

ANCHOR BOLT SYSTEM FOR TOILET AND METHOD OF MOUNTING A TOILET USING THE SYSTEM

BACKGROUND OF THE INVENTION

Field of the Invention

This invention relates to anchor bolt systems utilized to maintain a toilet on a support surface therefor and, more particularly, to an anchor bolt system including a cap for placement over an exposed end region of an anchor bolt shank. The invention further relates to a method of mounting a toilet to a support surface utilizing the anchor bolt system.

Background Art

Anchor bolts are used to maintain a toilet on a support surface therefor. The anchor bolts cooperate with a closet collar that transitions to a drain pipe and has a flange that is fixed in relationship to the support surface. It is common to use a wax component to seal between an upper surface of the flange and the toilet to prevent communication of sewer gas into a space and confine sewage discharge to the drain pipe.

Closet collar flanges have a number of different configurations, including one form which has slots or channels to receive the anchor bolt heads whereby the flange can be fixed to the support surface without the anchor bolt heads being wedged so as to create a gap between the bottom of the flange and support surface.

The closet collar flange is typically attached to the support surface with screws, with the anchor shanks projecting upwardly therefrom to be directed into and through openings on a mounting portion of a toilet. Nuts engage the threaded shanks of the anchor bolts and, when tightened, draw the toilet down to the support surface, thereby creating a seal between the toilet and the closet collar flange. The nuts are ideally tightened to the point that they cause a positive seal to be created between the toilet and closet collar flange and at the same time cause the toilet to be stably mounted with respect to the support surface.

To create the desired captive force between the toilet and the closet collar flange, typically the nuts on the anchor bolts are tightened using a wrench. Using a wrench creates a number of potential problems. Since sealing structures generally do not provide a substantial resistance to tightening, nuts on anchor bolts may be easily overtightened when using a wrench capable of applying a substantial torque. Thus, installers may, out of caution, tend to tighten the nuts inadequately—fearing cracking the porcelain on the toilet. There is a further danger of overtightening the nuts that causes cracks to be produced in the closet collar flange, thereby potentially compromising the stability of the toilet mount and the integrity of the seal between the toilet and flange.

Still further, the use of a large wrench may result in repeated contact between the wrench and the porcelain toilet surfaces, which could damage the surface thereof and potentially create cracks. Further, an installer's hand may be inadvertently compressed between the wrench and toilet as the wrench is manipulated.

In a common anchor bolt construction, the anchor bolt shank extends upwardly to beyond an upwardly facing surface on a mounting portion of the toilet. A washer is utilized to bear on the upwardly facing surface. A nut is threaded onto the exposed shank portion of the anchor bolt and tightened to produce a downward force on the upwardly facing toilet surface through the washer.

Once the nuts are tightened, it is common to use a decorative cap to make the region around the anchor bolts easier to clean and to produce a more aesthetically pleasing appearance. Caps are typically offered in plastic or porcelain in an inverted cup shape which is placed over the exposed anchor bolt shank region, including the nut threadably engaged therewith and any underlying washer.

Anchor bolts come in different thread sizes and are commonly made from metal materials such as steel or brass. Non-metal anchor bolts are also used. Typically, the anchor bolts range from ¼ inch to 5/16 inch in diameter and have overall lengths between 2 and 3.5 inches. The different lengths are provided to accommodate different vertical locations of the fixed closet collar flange. For example, the underside of the flange, when fixed, may be placed facially against a surface that is at the same height as the finished floor surface. With this site condition, generally ½ to 1 inch of a two-inch bolt needs to be removed to allow a conventional-type cap to be placed over the free end region of the bolt shank and the nut thereon.

In other applications, the closet collar flange may be recessed below the finished floor surface, such as by 2.5 inches, thereby requiring the longer 3.5 inch anchor bolts. Generally, if the closet collar flange extends to above the finished floor surface, or is recessed less than 2.5 inches below the floor surface, a length of the free end region of the bolt will have to be removed to allow a conventional-type cap to be utilized.

Once the nuts are tightened on the anchor bolts, it may be difficult to cut the anchor bolt shank to remove an excess length thereof, particularly if the anchor bolts are made from metal. Toilets are commonly placed in compact spaces between walls, cabinets, bathtubs/showers, etc. This is complicated by the fact that the anchor bolt shanks extend upwardly from the mounting portion of the toilet close to the wall transitioning up to define the bowl region.

A well-known cutting technique utilizes a saw blade that is moved back and forth to progressively sever the anchor bolt shank. Installers, particularly end users, may not have appropriate saws on hand to effect cutting. Even skilled persons contend with the challenge of maneuvering a saw blade back and forth in tight quarters without inadvertently and undesirably impacting the porcelain exterior of the toilet. Further, during the hand maneuvering the saw blade is likely to be undesirably impacted with hard porcelain as cutting is carried out. Again, the problem of pinching of the installer's hand between the tool and toilet is contended with.

As a result of these problems, it is common for many persons to leave the anchor bolt shanks with an excess length at the free end region thereof. In this condition, a cap may not be practically usable or, if used, may be suspended unstably on the free end of the anchor bolt shank. As a result, the region around the anchoring locations is prone to becoming unsanitary in addition to being unsightly.

Given the above problems, a number of attempted solutions have been developed to eliminate the need to a cut anchor bolts. Generally, the lack of full range of heights and adjustability to cover from 1 inch to 3.5 inches have added complexity and cost to installation without a full range of functionality.

One proposed solution has been to provide the anchor bolt shanks with strategically located weakening points whereby selected, discrete lengths of the shank can be broken off.

However, if the shank is inadvertently broken off at the wrong location, additional cutting may be required.

Further, this latter design generally requires a user to apply the break off force using a wrench or a like leveraging tool to apply an adequate force to the bolt shank to effect its fracture. Maneuvering of the wrench may result in in inadvertent contact with the porcelain surfaces of the toilet, which may inflict damage thereto. A similar result may occur if the wrench slips from the installer's hands during this process.

Still further, the force applied to break off the anchor bolt shank may loosen the connection between the head region of the anchor bolt and the closet collar flange. This may cause the head region of the anchor bolt to disengage from the closet collar flange, whereby it is no longer appropriately stably bearing on a downwardly facing surface associated with the flange. If this occurs, the nuts may have to be separated from their respective anchor bolt, after which the toilet is elevated and the anchor bolts reengaged at the head region. Essentially, this requires a complete re-anchoring of the toilet.

Nylon plastic anchor bolts and nuts have been used to address the aforementioned cutting problem. However, using conventional tools, the installer still faces the same issues associated with the cramped space in which maneuvering of the tools is difficult. Still further, the tools used to cut plastic bolt shanks may induce vibrations and/or wedge the anchor bolts such that the head region disengages from the closet collar flange, as discussed above.

Closet collars and closet collar flanges are commonly constructed of PVC or ABS plastic or cast iron, stainless steel, or cold-rolled metal. Closet collar flanges, regardless of the material from which they are constructed, tend to break around slotted areas, that are used to accommodate anchor bolts, and around openings for fasteners that are directed through closet collar flanges and tightened into a subjacent surface. When the anchor bolts are over-tightened, or the toilet is rocked in use, it can put undue stresses on the flange, particularly where it is compromised by slots or openings to accept fasteners. As a result, anchor bolts may be drawn through closet collar flanges made from thin metal or may crack cast iron or plastic flanges.

Further, if a seal leaks over a metal closet collar flange, the flange material may rust away, eventually allowing the anchor bolt to pull through the flange.

A failed closet collar flange may necessitate a replacement. Alternatively, repair flanges are fastened over the top of an already in place closet collar. Typically, the repair flanges are fixed using threaded fasteners directed through the repair flange and the existing closet collar flange to engage the support surface for the toilet. In the event that a repair flange is utilized, to avoid leakage of sewer gas, at least one sealing component is provided between the existing closet collar flange and the repair flange and similarly between the repair flange and the toilet.

Repair flanges are offered such that installers may opt to, or inadvertently, connect the repair flange to the existing closet collar flange without any sealing component therebetween. Thus, this region is prone to allowing migration of sewer gas into a space.

In spite of the vast number of toilets that are installed worldwide, and the ongoing continuous challenges in construction and installation, as described above, the industry has failed to offer adequate solutions to many of these problems, whereby installers must continue to contend with them.

SUMMARY OF THE INVENTION

In one form, the invention is directed to the combination of a closet collar, an anchor bolt, a cap support assembly, and a cap. The closet collar has a flange with a top and bottom and is configured to be anchored relative to a support surface upon which a toilet is to be mounted. The anchor bolt has a head portion and an elongate shank. The anchor bolt elongate shank extends away from the anchor bolt head portion and has a lengthwise axis. The anchor bolt is configured to be operatively connected to the closet collar. The anchor bolt and closet collar are configured so that with the anchor bolt operatively connected to the closet collar: a) at least a part of the anchor bolt elongate shank projects to above the top of the closet collar flange to allow the at least part of the anchor bolt elongate shank to be passed into an opening in a mounting portion of a toilet being mounted; and b) the anchor bolt head portion bears against the closet collar flange to prevent the anchor bolt from being drawn axially upwardly and to away from the closet collar flange. The cap support assembly is engageable with the anchor bolt elongate shank adjacent a free end region of the anchor bolt elongate shank. There are cooperating components on the cap and cap support assembly that are engageable to maintain the cap in assembled relationship with the cap support assembly whereby the cap cannot be separated from the cap support assembly by exerting a force upon the cap along the lengthwise axis of the anchor bolt elongate shank. The cap support assembly and anchor bolt are configured to cooperate so that at least part of the cap support assembly can be maintained in a plurality of different positions along the lengthwise axis of the anchor bolt elongate shank.

In one form, the anchor bolt elongate shank has a threaded length. The cap has an axis that is substantially parallel to the lengthwise axis of the anchor bolt elongate shank with the cap support assembly engaged with the anchor bolt and the cap in assembled relationship with the cap support assembly. The cap support assembly has a nut assembly that is threadably engageable with the threaded length of the anchor bolt elongate shank. The cooperating components on the cap and cap support assembly are made up of at least one surface/edge on the cap that confronts at least one surface/edge on the cap support assembly to block movement of the cap axially away from the cap support assembly with the cap in assembled relationship with the cap support assembly.

In one form, the at least one surface/edge on the cap support assembly faces in one axial direction. The at least one surface/edge on the cap faces axially oppositely to the one axial direction in a second axial direction. The cap and cap support assembly are configured so that with the cap and cap support assembly in a pre-assembly angular orientation and fully axially spaced from each other, the cap can be advanced in the first axial direction to cause the at least one surface/edge on the cap to move axially up to and past the at least one surface/edge on the cap support assembly, whereupon the cap can be turned relative to the cap support assembly to place the at least one surface/edge on the cap in confronting relationship with the at least one surface/edge on the cap support assembly.

In one form, the anchor bolt head portion has a flat, axially facing surface that bears against the closet collar flange to prevent the anchor bolt from being drawn axially upwardly and to away from the closet collar flange with the anchor bolt operatively connected to the closet collar. The closet collar elongate shank has an outer surface with a diameter. The anchor bolt head portion has a transition region between a proximal end of the anchor bolt elongate shank and the flat surface that is radially enlarged with respect to the proximal end of the anchor bolt elongate shank.

In one form, the anchor bolt elongate shank and head portion are made from a non-metal material. The combination described above is provided in further combination with a stabilizing component that is threadably engaged with the anchor bolt adjacent the transition region so that the flange can be captively maintained between the stabilizing component and the anchor bolt head, wherein the stabilizing component surrounds a portion of the transition region.

In one form, the anchor bolt head portion has a flat, axially facing surface that bears against the closet collar flange to prevent the anchor bolt from being drawn upwardly and to away from the closet collar flange with the anchor bolt operatively connected to the closet collar. The anchor bolt has first and second joinable parts. The first joinable part defines at least a part of the anchor bolt elongate shank. The second joinable part defines the flat axially facing surface on the anchor bolt head portion.

In one form, the first joinable part is made from a non-metal material and the second joinable part is made from a metal material.

In one form, the first and second joinable parts are threadably engageable, each with the other.

In one form, the anchor bolt elongate shank has a stepped outer diameter with a first lengthwise portion having a first diameter and a second lengthwise portion having a second diameter that is less than the first diameter. The first lengthwise portion is closer to the anchor bolt head portion than the second lengthwise portion.

In one form, the nut assembly has a body with an axis and a radially projecting portion on which the at least one surface/edge on the cap support assembly is defined. The radially projecting portion has a radially outer edge that extends less than 90° around the body axis.

In one form, the nut assembly has a body with an axis. The body has radially oppositely projecting first and second portions. The at least one surface/edge on the cap support assembly has first and second surfaces/edges respectively on the radially oppositely projecting first and second body portions.

In one form, the nut assembly body has first and second concave surfaces that open radially oppositely to facilitate grasping of the head between fingers on a user's hand.

In one form, the at least one of the cap and cap support assembly has a circumferential gap through which the at least one surface/edge on the other of the cap and cap support assembly moves with the cap and cap support assembly in the pre-assembly angular orientation and fully spaced from each other to allow the cap to be advanced in the first axial direction and the at least one surface/edge on the cap to move axially up to and axially past the surface/edge on the cap support assembly.

In one form, the at least one surface/edge on one of the cap and cap support assembly has a detent part that engages the at least one surface/edge on the other of the cap support assembly to generate a frictional engagement force as the cap is turned relative to the cap support assembly to place the at least one surface/edge on the cap in confronting relationship with the at least one surface/edge on the cap support assembly.

In one form, the cap is turned around the anchor bolt shank lengthwise axis in a first direction to place the at least one surface/edge on the cap in confronting relationship with the at least one surface/edge on the cap support assembly. There is a detent arrangement defined between the cap and cap support assembly that dictates a degree of resistance to turning of the cap in the second direction around the anchor bolt shank lengthwise axis after the cap is turned around the anchor bolt shank lengthwise axis in the first direction to place the at least one surface/edge on the cap in confronting relationship with the at least one surface/edge on the cap support assembly.

In one form, the nut assembly body is threadably engaged with the anchor bolt elongate shank. The at least one surface/edge on the nut assembly body consists of at least one surface/edge on the nut assembly body facing one axial direction and at least one surface/edge on the nut assembly body facing oppositely to the one axial direction. The nut assembly body is threadably engageable with the anchor bolt shank in a first orientation and in an inverted orientation to allow the at least one surface/edge on the nut assembly body to cooperate with the at least one surface/edge on the cap.

In one form, the cap has a receptacle with a volume. With the cap in the assembled relationship with the cap support assembly, at least a part of the cap support assembly is extended into the volume of the cap receptacle.

In one form, the first and second parts are threadably joined together. The first joinable part has an axially facing surface/edge and is configured so that by relatively turning the threadably joined first and second joinable parts, the closet collar flange can be captured between the anchor bolt head portion and axially facing surface/edge on the first joinable part so as to stabilize the anchor bolt relative to the closet collar flange.

In one form, the nut assembly has a body. The cap has a cup-shaped configuration with an axis. A top wall and a peripheral wall extend around the axis of the cap. The cap has a portion depending from the top wall of the cap, spaced radially inwardly from the peripheral wall of the cap, and defining an edge that is guided against the nut assembly body as the cap is turned relative to the cap support assembly to place the at least one surface/edge on the cap in confronting relationship with the at least one surface/edge on the cap support assembly.

In one form, the combination described above is provided in further combination with a toilet having a mounting portion and wherein: a) the closet collar is fixed with respect to a support for the toilet; b) the anchor bolt elongate shank extends into a through opening in the mounting portion of the toilet; c) the cap support assembly is engaged with the anchor bolt elongate shank adjacent the free end region of the anchor bolt elongate shank; and d) the cap is in assembled relationship with the cap support assembly.

In one form, at least a portion of the anchor bolt elongate shank is made from a non-metal material that projects above the mounting portion of the toilet. The combination is provided in further combination with a cutting tool. The cutting tool has an elongate flexible element with a portion configured to be placed against the anchor bolt elongate shank and moved back and forth against the anchor bolt elongate shank to progressively abrade the non-metal material to sever the anchor bolt elongate shank and separate a discrete length thereof and re-define the free end region of the anchor bolt elongate shank.

In one form, the elongate flexible element has a length. First and second gripping elements are spaced along the length of the elongate flexible element and each engageable by a hand of a user to allow the user to draw the portion of the elongate flexible element back and forth against the anchor bolt elongate shank.

In one form, the cap support assembly has a nut assembly with a body that is threadably engaged with the anchor bolt elongate shank so that the mounting portion of the toilet is captured relative to a support surface for the toilet.

In one form, the combination described above is provided in further combination with a repair flange having a body with a top and bottom. The anchor bolt is configured to be operatively connected to the repair flange such that with the anchor bolt operatively connected to the repair flange: a) at least a part of the anchor bolt elongate shaft projects to above the top of the repair flange body to allow the at least part of the anchor bolt elongate shank to be passed into an opening in a mounting portion of a toilet being mounted; and b) the anchor bolt head portion bears against the repair flange body to prevent the anchor bolt from being drawn axially upwardly and to away from the repair flange body. The anchor bolt can be selectively operatively connected to one or the other of the closet collar and repair flange to cooperate with the cap support assembly in a same fashion.

In one form, the repair flange has a sealing component that is fixed at the bottom of the repair flange body to seal between the repair flange body and top of the closet collar flange with the repair flange connected to the closet collar.

In one form, the repair flange body has an opening bounded by an edge. With the anchor bolt operatively connected to the repair flange, the anchor bolt is keyed to the edge to limit turning of the anchor bolt relative to the repair flange body around the lengthwise axis of the anchor bolt elongate shank.

In one form, the anchor bolt has a head piece that is keyed to the repair flange body to limit turning of the anchor bolt relative to the repair flange body around the lengthwise axis of the anchor bolt elongate shank.

In one form, the invention is directed to a method of mounting a toilet to a support surface. The method includes the steps of: obtaining the combinations described above; operatively connecting the anchor bolt to the closet collar; anchoring the closet collar relative to the support surface; placing the toilet on the support surface so that the anchor bolt elongate shank is directed upwardly into a through opening on a mounting portion of the toilet so that the free end region of the anchor bolt elongate shank projects to above a top surface of the mounting portion of the toilet; threadably engaging the nut assembly body with the free end region of the anchor bolt elongate shank and thereby causing the nut assembly body to directly or indirectly exert an axial force on the top surface of the mounting portion of the toilet, to thereby place the nut assembly body in a fully connected position; and with the nut assembly body in a fully connected position, placing the cap in the fully assembled relationship with the cap support assembly.

In one form, the method further includes the step of severing the anchor bolt elongate shank to separate a discrete length of the anchor bolt elongate shank and redefine the free end region of the anchor bolt elongate shank.

In one form, the anchor bolt elongate shank has a length portion that is made from a non-metal material. The step of severing the anchor bolt elongate shank involves severing the length portion of the anchor bolt elongate shank made from a non-metal material.

In one form, the step of severing the length portion of the anchor bolt elongate shank involves moving a flexible element back and forth against the length portion of the anchor bolt elongate shank to progressively abrade the length portion of the anchor bolt elongate shank.

In one form, the step of placing the cap in the fully assembled relationship involves axially advancing the cap up to and into axially overlapping relationship with the nut assembly body and thereafter turning the cap relative to the nut assembly body through less than 360° to thereby engage the cooperating components on the cap and cap support assembly.

In one form, the cooperating components on the cap and cap support assembly include at least one surface/edge on the cap that confronts at least one surface/edge on the cap support assembly to block movement of the cap axially away from the cap support assembly with the cap in the fully assembled relationship.

BRIEF DESCRIPTION OF THE DRAWINGS

FIG. 3 is an exploded perspective view of one exemplary form of system as shown in FIG. 2;

FIG. 4 is a view as in FIG. 3 with the components in an assembled relationship;

FIG. 10 is a perspective view of the anchor bolt making up part of the system in FIG. 3;

FIG. 11 is a side elevation view of the anchor bolt in FIG. 10;

FIG. 16 is a perspective view of a nut assembly making up the cap support assembly on the system in FIG. 3;

FIG. 17 is a plan view of the nut assembly in FIG. 16;

FIG. 18 is an end elevation view of the nut assembly in FIGS. 16 and 17;

FIG. 19 is a cross-sectional view of the nut assembly taken along line 19-19 of FIG. 17;

FIG. 24 is a plan view of a cutting tool used to sever a discrete length of the anchor bolt shank;

FIG. 25 is a view as in FIG. 24 showing the cutting tool being moved back and forth against an anchor bolt shank;

FIG. 26 is a view as in FIG. 3 and showing a modified form of the inventive system;

FIG. 27 is a view as in FIG. 26 with the components in assembled relationship;

FIG. 37 is a view as in FIG. 20 and showing a modified form of cap, according to the invention;

FIG. 38 is a side elevation view of the cap in FIG. 37;

FIG. 39 is a bottom perspective view of the cap in FIGS. 37 and 38;

FIG. 40 is a bottom view of the cap in FIGS. 37-39;

FIG. 41 is a cross-sectional view of the cap taken along line 41-41 of FIG. 40;

FIG. 42 is a cross-sectional view of the cap taken along line 42-42 of FIG. 40 and additionally showing the nut assembly in FIGS. 16-18, threadably engaged with a length of an anchor bolt, and operatively connected therewith;

FIG. 43 is a fragmentary view showing cooperating portions of the cap and nut assembly as the cap is being directed into fully assembled relationship with the nut assembly;

FIG. 44 is a view as in FIG. 43 with the cap in fully assembled relationship with the nut assembly;

FIG. 47 is a bottom view of the repair flange in FIGS. 45 and 46;

FIG. 48 is a cross-sectional view of the anchor bolt, taken along line 48-48 of FIG. 9 and usable in conjunction with the repair flange in FIGS. 45-47;

FIG. 49 is a cross-sectional view of the repair flange taken along line 49-49 of FIG. 47;

FIG. 52 is a bottom view of the components in FIG. 50;

FIG. 53 is a cross-sectional view of the repair flange and operatively connected anchor bolts taken along line 53-53 of FIG. 52;

FIG. 56 is a cross-sectional view of the components in FIG. 54 taken along line 56-56 therein;

FIG. 58 is a reduced, top view of the repair flange in FIG. 57;

FIG. 59 is a cross-sectional view of the repair flange taken along line 59-59 of FIG. 58;

FIG. 60 is a bottom view of the repair flange in FIGS. 57-59;

FIG. 72 is a side elevation view of the cutting tool in FIG. 69;

FIG. 73 is a plan view of the cutting tool in FIGS. 69 and 72;

FIG. 74 is a cross-sectional view of the cutting tool taken along line 74-74 of FIG. 72.

DETAILED DESCRIPTION OF THE PREFERRED EMBODIMENT

Figure 1:
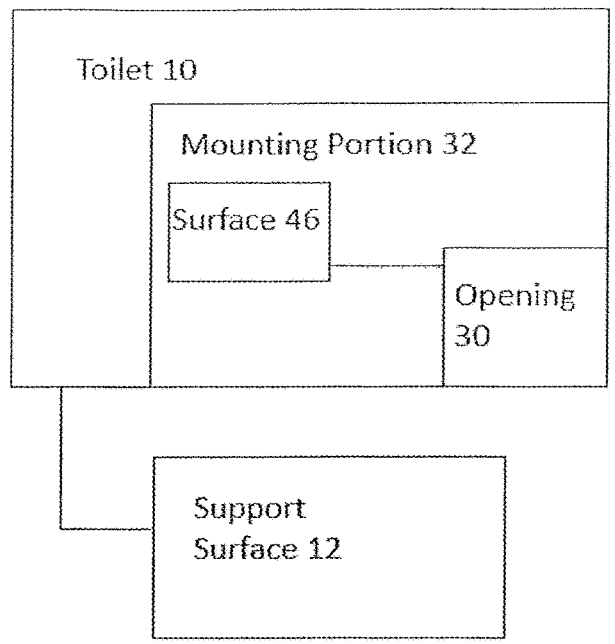
FIG. 1 is a schematic representation of a toilet to be mounted on a support surface and with which the present invention can be used.

In FIG. 1, a conventional toilet is shown in schematic form at 10. The toilet 10 is designed to be mounted on a support surface 12. For purposes of clarity, the support surface 12 will be considered to be an upwardly facing surface. However, the support surface 12 may actually be formed on a vertical wall, whereby the support surface 12 faces other than upwardly. It should be understood that the references throughout the description and claims herein to "top", "bottom", "upwardly facing", "downwardly facing", etc., for the support surface 12 and components associated with mounting the toilet 10, are included for reference purposes and should not be limited to literal interpretation. That is, "upward" with respect to a closet collar on a vertical wall is actually sideways/horizontally.

Figure 2:
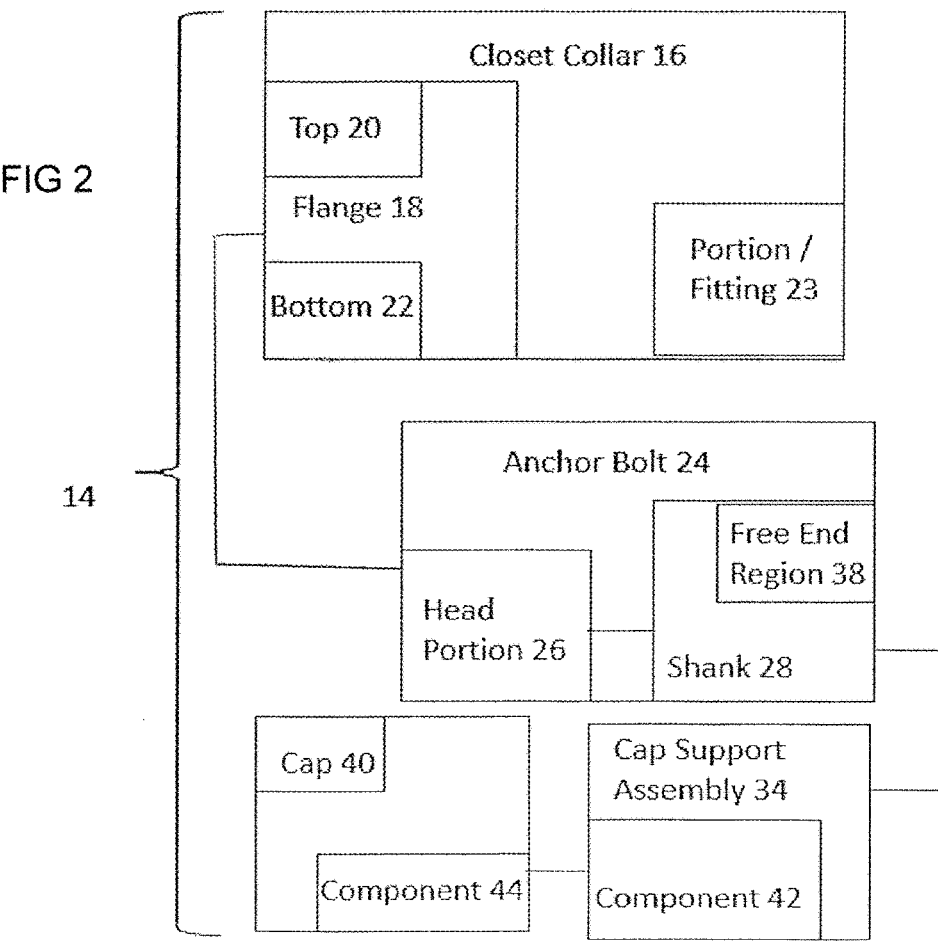
FIG. 2 is a schematic representation of a system, according to the invention, including a closet collar, anchor bolt, cap support assembly connectable to the anchor bolt, and a cap connectable to the cap support assembly.

In FIG. 2, there is a schematic depiction of a system at 14, according to the invention, for mounting the toilet 10 to the support surface 12.

The system 14 consists of a closet collar 16 with an associated flange 18 having a top 20 and bottom 22.

The precise configuration of the closet collar 16 is not critical and may take many different constructions, including a portion/fitting 23 that cooperates with the open end of a drain pipe.

The closet collar 16 is anchored with respect to the support surface 12 with the bottom 22 of the flange 18 at floor surface level, or potentially alternatively either above or below floor surface level.

An anchor bolt 24 cooperates with the flange 18 and has a head portion 26 and an elongate shank 28 extending away from the head portion 26 and having a lengthwise axis.

The head portion 26 may be integrally formed with the flange 18 and is more commonly separately formed therefrom and strategically engaged within a slot on the flange 18 so as not to project below the bottom 22 of the flange 18 but to be braced against the flange 18 so as not to be separable by being drawn upwardly away therefrom. The anchor bolt 24 will be considered to be operatively connected to the closet collar 16 in either form.

The anchor bolt 24 and closet collar 16 are configured so that with the anchor bolt 24 operatively connected to the closet collar 16: a) at least a part of the anchor bolt shank 28 projects to above the top 20 of the flange 18 to allow the at least part of the shank 28 to be passed into an opening 30 in a mounting portion 32 of the toilet 10 in FIG. 1; and b) the head portion 26 bears against the flange 18 to prevent the anchor bolt 24 from being drawn axially upwardly and to away from the flange 18.

A cap support assembly 34 is engageable with the anchor bolt shank 28 adjacent a free end region 38 thereon. A cap 40 is provided, with there being cooperating components 42, 44, respectively on the cap support assembly 34 and cap 40, that are engageable to maintain the cap 40 in assembled relationship with the cap support assembly 34. In this assembled relationship, the cap 40 cannot be separated from the cap support assembly 34 by exerting an upward force upon the cap 40 along the lengthwise axis of the elongate shank 28 of the anchor bolt 24.

The cap support assembly 34 and anchor bolt 24 are configured to cooperate so that at least a part of the cap support assembly 34 can be maintained in a plurality of different positions along the lengthwise axis of the anchor bolt shank 28.

In operation, the closet collar 16 is anchored with respect to the support surface 12, with the bottom 22 of the flange 18 at, below, or above the level of the support surface 12. The flange 18 typically has through openings with undercuts to accept heads of anchoring screws so that the anchoring screw heads are nominally flush with the top 20 of the flange 18. With the closet collar 16 anchored and the anchor bolt 24 projecting upwardly from the flange 18, the toilet 10 can be lowered towards the support surface 12, which causes the free end region 38 of the shank 28 to be directed into the opening 30 on the mounting portion 32 of the toilet 10. By engaging a part of the cap support assembly 34 with the free end region 38 of the shank 28, a part of the toilet mounting portion 32 is captively maintained between the part of the cap support assembly 34 and the closet collar flange 18. This is accomplished by causing the part of the cap support assembly 34 to bear against a surface 46 on the mounting portion 32. Multiple anchor bolts 24 are typically used in the same fashion on each toilet 10.

The schematic showing of the components in FIGS. 1 and 2 is intended to encompass not only specific forms of the components as shown herein and described hereinbelow, but an unlimited number of variations of those components and their interaction.

For example, the precise configuration of the toilet mounting portion 32 is not critical to the present invention. Further, the closet collar 16 may have many different forms that include the flange 18, with the flange potentially being one or more parts—in the latter case potentially including a repair flange part used in conjunction with the original flange 18. Sealing components—with or without mounting ears—between flange parts and between a flange part and a subjacent support surface may be considered to be part of the flange. For simplicity, the stacked flange parts are considered to make up a single flange.

Similarly, certain aspects of the invention can be practiced with the anchor bolt 24 fixedly attached to the flange 18, whereas in specific embodiments herein the anchor bolt 24 is initially separate from and attached to the flange 18.

The cap 40 is generally desired to perform a protective covering function and additionally to improve the overall aesthetics of the mounted toilet at the location of the various mounting portions 32. Its exposed surface shape is not in any way limited.

The cap support assembly 34 can also take a multitude of different forms, with those specific forms depicted and described herein being exemplary in nature only.

One exemplary form of the system 14 is shown in FIGS. 3-23, in association with the toilet 10, as shown in FIG. 1.

In this embodiment, the anchor bolt 24 is separate from the closet collar 16, including the flange 18 making up a part of the closet collar 16. The closet collar 16 has a cylindrical body portion/fitting 23, formed integrally with the flange 18, that aligns with a drain pipe 50 and cooperates therewith in well-known fashion to define a communication path between the toilet bowl and the drain pipe 50.

The toilet 10 has multiple mounting portions 32, each which can cooperate with the anchor bolt 24 in like fashion. The toilet 10 is configured to be anchored to the support surface 12 and to be fixedly mounted with respect thereto through the system 14.

Figure 5:
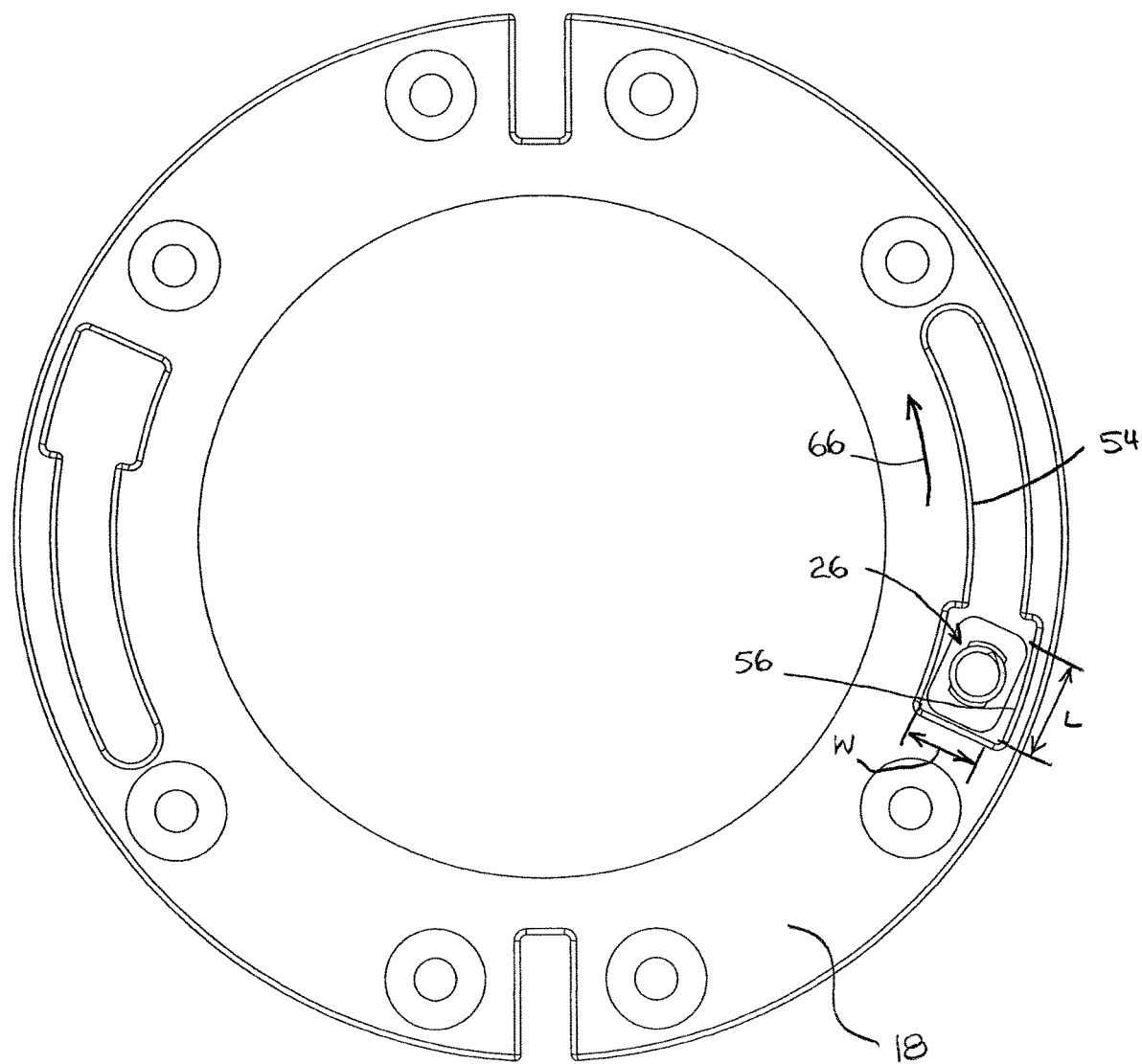
FIG. 5 is an enlarged, plan view of a key slot on a closet collar that can be engaged with the anchor bolt as shown in FIGS. 3 and 4.

The head portion 26 and elongate shank 28 extending away from the head portion 26 cooperatively define what is commonly identified as "T bolt". The depicted head portion configuration has a generally rectangular shape as viewed along the lengthwise axis 53 of the elongate shank 28 including a length dimension L and a width dimension W. This footprint is designed to engage the flange 18 through introduction into a key slot 54 as shown in FIG. 5. The slot 54, as viewed from above, has a substantially rectangular entry opening 56 slightly larger peripherally than the footprint of the head portion 26 and that is contiguous with a narrower arcuate slot portion 58 with a radius matched generally to that of the flange 18, which is typically ring-shaped. By lowering the head portion 26 into and through the entry opening 56, the narrower shank 28 can be shifted guidingly through the arcuate slot portion 58 which places an axially facing surface 60 on the head portion in confronting relationship with spaced, downwardly facing surface portions 62 on opposite edges of the slot 56. This relationship can be seen clearly in FIG. 6, wherein a free end surface 64 on the head portion 26, facing axially oppositely to the surface 60, is shown in confronting relationship with the support surface 12.

Thus, the anchor bolt 24 can be operatively connected to the closet collar 16 by lowering the head portion 26 into the entry opening 56 and guidingly translating the anchor bolt 24 in a slightly arcuate path, as indicated by the arrow 66 in FIG. 5. With the anchor bolt 24 operatively connected, an upward force on the anchor bolt shank 28 brings the surface 60 into engagement with the surface portions 62 to prevent the anchor bolt 24 from being drawn upwardly away from the flange 18.

As noted above, the precise structure for operatively connecting the anchor bolt to the closet collar is not critical, with the depicted form being exemplary in nature only.

In a preferred form, the anchor bolt 24 is made from a non-metal material. In the depicted embodiment, the shank 28 has an outer surface 68 with a diameter D. The head portion 26 includes a transition region at 70, between a proximal end 72 of the shank 28 and the surface 60, that is progressively radially enlarged towards the surface 60 that is defined on a squared head piece 73 bounded by the axially oppositely facing surfaces 60, 64. The transition region has radially oppositely facing flat surfaces 74 that are spaced a distance approximately equal to the diameter D to allow the transition region 70 to move through the arcuate slot portion 58.

With an upward axial tensile force applied to the shank 28, the transition region 70 distributes this force over a larger area of the head piece 73 than the cross-sectional area of the shank above the transition region 70.

A stabilizing component 78 has internal threads 80 that engage external threads 82 on the shank 28 to allow the stabilizing component 78 to be turned and advanced along the length of the shank to the FIG. 3 position, wherein the reduced thickness t of the flange 18 at the key slot 54, between the surface portions 62 and the top 20 of the flange 18, is captured between a bottom edge 84 of the stabilizing component 78 and the surface 60 on the head portion 26. The head piece 73 is typically keyed to the flange 18 so that the anchor bolt 24 will not turn around its axis 53 as the stabilizing component 78 is threadably connected thereto and tightened.

Figure 12:
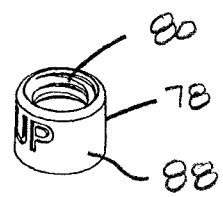
FIG. 12 is a perspective view of a stabilizing component, on the system in FIG. 3, and connectable to the anchor bolt to stabilize the anchor bolt with respect to the closet collar.
Figure 13:
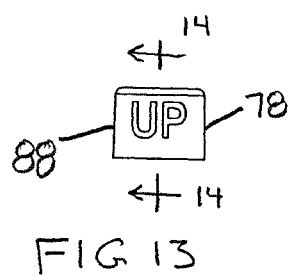
FIG. 13 is a side elevation view of the stabilizing component in FIG. 12.
Figure 14:
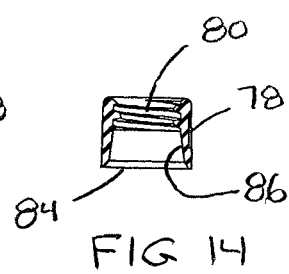
FIG. 14 is a cross-sectional view of the stabilizing component taken along line 14-14 of FIG. 13.
Figure 15:
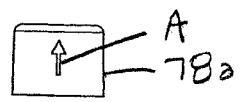
FIG. 15 is a view as in FIG. 13 of a modified form of stabilizing component.
Figure 20:
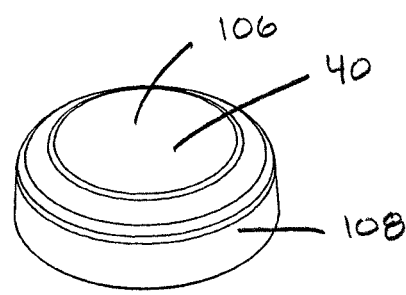
FIG. 20 is a perspective view of a cap on the inventive system in FIG. 3.
Figure 21:
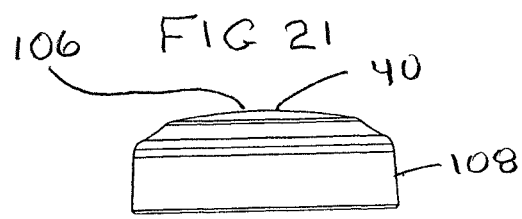
FIG. 21 is a side elevation view of the cap in FIG. 20.

As seen in FIG. 12, the internal threads 80 extend over only a portion of the axial extent of the stabilizing component 78. The lower region of the stabilizing component 78 has a bore portion 86 that increases in diameter in a downward direction from the threads 80 to allow the lower region of the stabilizing component 78 to surround part or all of the transition region 70 thereby to effect reinforcement of the transition region 70 and stabilizing of the connection of the anchor bolt 24 and flange 18.

To avoid improper inverted orientation of the stabilizing component 78, as it is being threadably engaged to the shank 28, visible indicia are provided on the outer surface 88 thereof. In FIGS. 10 and 11, the word "UP" is provided, whereas in FIG. 13 an upwardly pointing arrow A is provided on a modified form of the stabilizing component 78a to assist proper orientation.

To facilitate alignment and joining of components, including but not limited to the stabilizing component 78, and a part of the cap support assembly 34, as described below, the distal end 90 of the shank 28 has a rounded configuration with a progressively increasing diameter from top to bottom.

To assist hand-tightening of the stabilizing component 78, the outer surface 88 is provided with discrete, radial projections 92 (FIGS. 3 and 4). This knurled arrangement facilitates gripping, which is desirable given the potentially small gripping diameter of the stabilizing component 78.

The cap support assembly 34 consists of a nut assembly 94. The cap support assembly 34 nut assembly 94 may be made from multiple parts/components, with the depicted form again only exemplary in nature. While not limited to this construction, the nut assembly 94 has a body 96 with a through bore 98 having internal threads 100 that are engageable with the external threads 82 on the anchor bolt 24.

The nut assembly 94 is symmetrical about a plane P (FIG. 19), orthogonal to the axis 53 of the through bore 98, which allows the nut assembly 94 to be threadably engaged with the body 96 in the FIG. 3 orientation or inverted from that orientation. This simplifies assembly in that it obviates the need for the installer to identify a top and a bottom of the body 96.

For purposes of simplicity, the cap 40, body 96, stabilizing component 78, and anchor bolt shank 28 will be described herein to have the same axis 53. However, it is not necessary that the cap 40, body 96, stabilizing component 78, and shank 28 all have the same axis.

In one exemplary form, and without limitation, each of the cooperating components 42, 44 is in the form of at least one surface/edge. With the cap 40 in assembled relationship with the cap support assembly 34, the at least one surface/edge 42 on the cap support assembly 34 confronts the at least one surface/edge 44 on the cap 40 to block movement of the cap 40 axially away from the cap support assembly 40.

The body 96 on the nut assembly 94 has at least one radially projecting portion 102a and, as depicted, two radially oppositely projecting portions 102a, 102b, on each of which at least one of the surface/edges 42 is defined.

Each radially projecting portion 102a, 102b has a radially outer edge 104a, 104b, respectively, each extending less than 90° around the body axis 53.

Since the body 96 cooperates with the shank 28 and cap 40 in the same manner in inverted orientations, it is only necessary to describe one of the body halves above or below the plane P in FIG. 19.

The cap 40 has a top wall 106 and a peripheral wall 108 cooperatively producing an inverted cup-shaped configuration. The cap 40 defines a receptacle 110 with a volume. With the cap 40 in assembled relationship with the cap support assembly 34, as shown in FIGS. 6-9, at least part of the cap support assembly 34 is extended into the volume of the receptacle 110.

The cap 40 has arcuate rim portions 112a, 112b extending radially inwardly from the peripheral wall 108. As depicted, the rim portions 112a, 112b are substantially the same in configuration, although this is not a requirement.

Circumferential gaps 114a, 114b are defined between the rim portions 112a, 112b at diametrically opposite locations.

Figure 23:
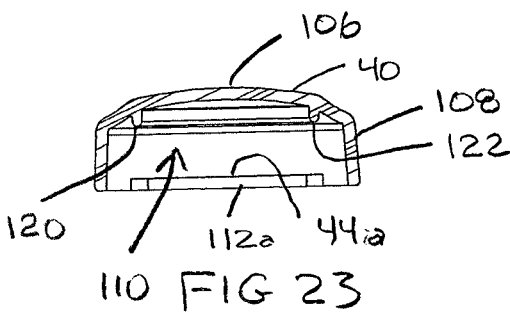
FIG. 23 is a cross-sectional view of the cap taken along line 23-23 of FIG. 22.
Figure 22:
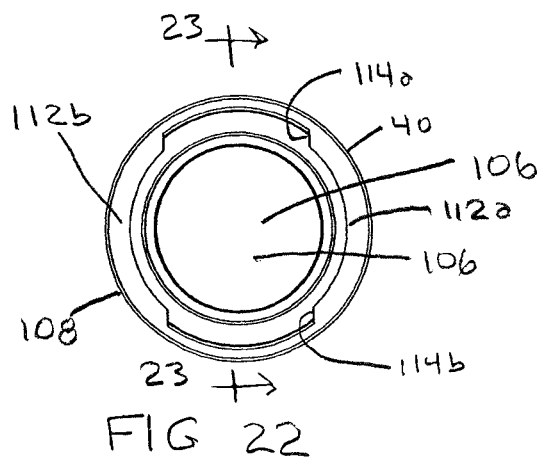
FIG. 22 is a bottom view of the cap in FIGS. 20 and 21.

Each of the arcuate rim portions 112a, 112b defines a surface/edge 44a, 44b, respectively, of like construction. In FIG. 23, the surface/edge 44a is shown on the arcuate rim portions 112a and faces axially upwardly.

The radially projecting portions 102a, 102b have arcuate ribs 116a, 116b axially centered on the body 96 and having a vertical/axial dimension AD (FIG. 19) less than the full axial dimension AD1 (FIG. 18) of the body 96. As depicted, the dimension AD is approximately one-third the dimension AD1. This dimensional relationship is not critical. This produces steps 118a, 118b, resulting in the formation of the surface/edge 42a, 42b on each radially projecting part 102a, 102b. As explained above, a mirror image of this shape is defined on the axially opposite side of the body 96.

The cap 40 and body 96 are configured so that with the body 96 and cap 40 in axial alignment and spaced axially from each other, the radially projecting portions 102a, 102b can be angularly aligned, one each, with the gaps 114a, 114b. This represents a pre-assembly angular orientation between the cap 40 and cap support assembly 34. By then moving the cap 40 and nut assembly 94 axially towards each other, the axially facing surfaces/edges 42a, 42b on the cap support assembly 34 can move axially up to and past the surfaces/edges 44a, 44b on the cap 40.

By then relatively turning the cap 40 and body 96 around the axis 29, the surfaces/edges 44a, 44b can be placed in confronting relationship with the surfaces/edges 42a, 42b, whereupon the cap 40 cannot be separated from the cap support assembly 34 by exerting an upward force upon the cap 40 along the axis 53.

Corresponding surfaces/edges 44a', 44b' are used in the same fashion with the body 96 inverted.

An annular rim 120, that may be continuous or made up of arcuate parts, depends from the top wall 106 of the cap 40 and defines a downwardly facing guide surface/edge 122. The guide surface/edge 122 acts against the upper surface 124 of the body 96 when in the FIG. 16 orientation. This controlled contact area facilitates smooth guidance of the cap 40 relative to the body 96. The degree of radial spacing of the guide surface/edge 122 from the peripheral wall 108 dictates the degree of surface contact and frictional resistance between the cap 40 and body 96. The surface 124 is smooth to facilitate sliding of the guide surface/edge 122 thereagainst.

To generate a desired holding force between the cap 40 and cap support assembly 34, with the cap 40 in fully assembled relationship therewith, one or more of the surfaces/edges may incorporate a detent part. In FIG. 18 two exemplary detent parts 126 are shown on the surface/edge 42b which confronts a surface/edge 44b on the cap 40 with the cap 40 in assembled relationship with the cap support assembly 34. For purposes of simplicity, the detent parts 126 are considered to be part of the surface/edge 42b on which they are provided. This is true of all the detent parts used throughout the system 14 on confronting surfaces/edges. The detent arrangement may be used to enhance a holding force between the cap 40 and body 96 or to reduce the contact area between confronting surfaces/edges, which may facilitate smooth relative turning between the cap 40 and cap support assembly 34.

The detent arrangement dictates the resistance to the cap 40 in turning relative to the cap support assembly 34 once the cap 40 is placed in assembled relationship with the cap support assembly 34 and may alternatively be configured to consistently maintain the assembled cap 40 in a predetermined angular relationship with the cap support assembly 34.

Figure 9:
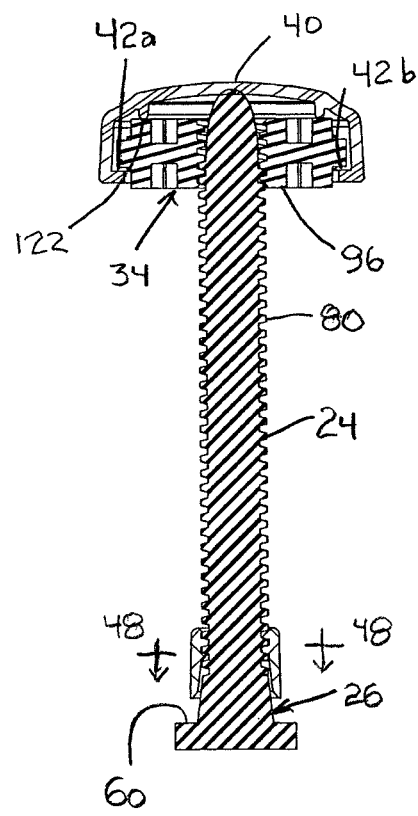
FIG. 9 is a cross-sectional view of the components taken along line 9-9 of FIG. 8.

As seen in FIG. 9, the body 96 becomes effectively captured between the guide edge 122 and the surfaces/edges 44a, 44b with the cap 40 in assembled relationship.

To facilitate grasping and turning of the body 96, the body 96 is formed with radially oppositely opening concave surfaces 128, 130. The body width between the surfaces 128, 130 is adequate that the installer can comfortably exert a substantial torque upon the body 96 during the assembly process. The axial dimension of the body 96 is selected to be graspable positively to effect adequate tightening. A thickness in the range of ⅜ to ¾ inch is appropriate, however, this range should not be viewed to be in any way limiting.

Figure 6:
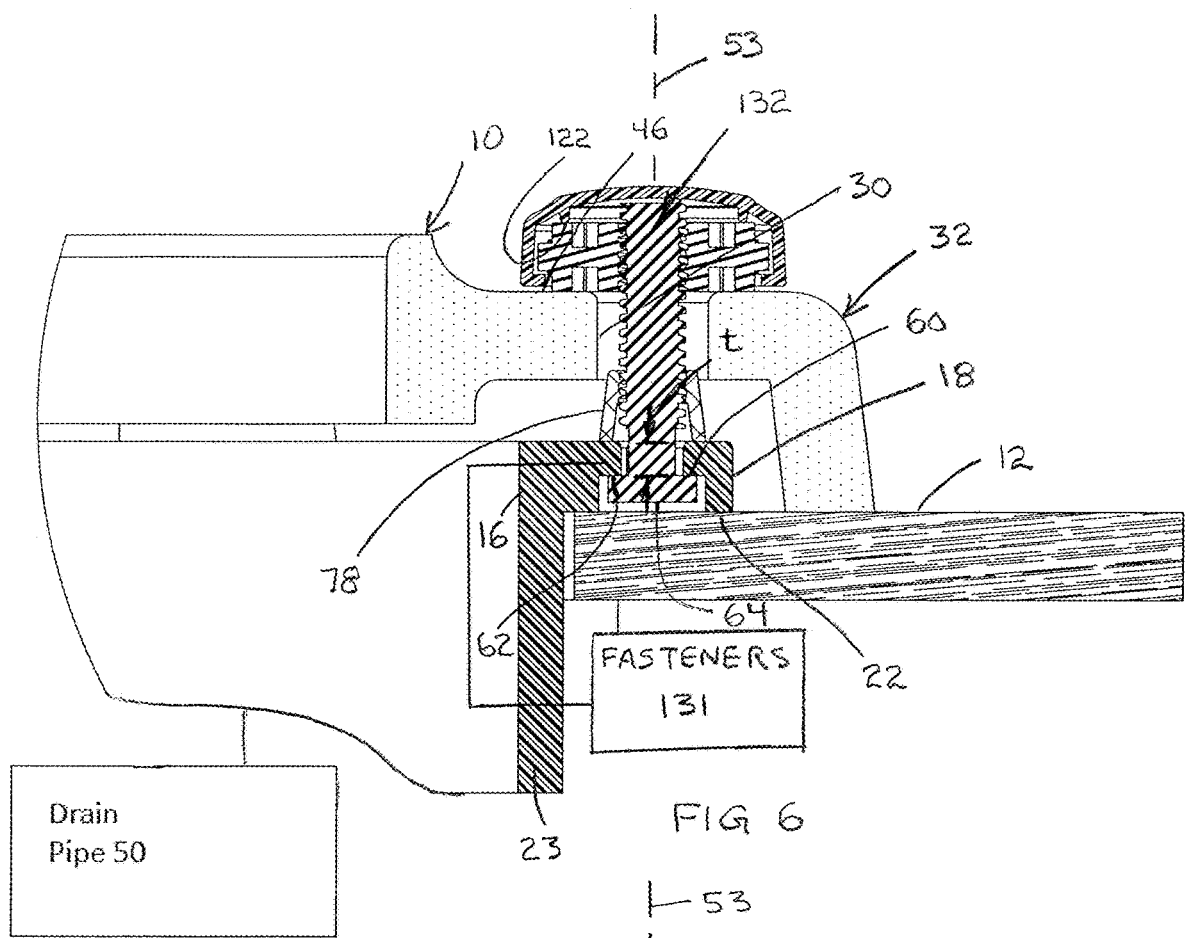
FIG. 6 is a fragmentary, cross-sectional view of a mounting portion of a toilet on a support surface and with the inventive system in FIG. 3 utilized to effect mounting thereof.

In a typical installation, with reference to FIG. 6, the closet collar 16 is fixed with respect to the surface 12 using conventional fasteners 131, such as screws, etc. Each anchor bolt 24 is directed into a key slot 54 strategically situated below a through opening 30 on the mounting portion 32 of the toilet 10 and stabilized using the stabilizing component 78.

The toilet 10 is then aligned and lowered towards the support surface 12, whereupon the anchor bolt shanks 28 project through toilet openings 30 to above the surfaces 46 on the mounting portions 32.

The body 96 on the nut assembly 94 is then threadably engaged at the free end region 132 of the shank 28 projecting to above the surface 46 on the mounting portion 32 and thereafter hand-tightened suitably so that the mounting portion 32 is stabilized and any seals (not shown) are properly seated. The torque is preferably applied entirely by the user's hand, which is adequate to complete the mounting process with the mounting portions 32 captured relative to the support surface 12. The smooth surfaces 124, 124a slide readily against the surface 46 or a washer (not shown) thereon to allow hand tightening of the body 96 to be adequate to effectively complete the mounting process.

Thereafter, the cap 40 is placed in the pre-assembly relationship with the body 96 and lowered until the edge 122 on the cap 40 abuts to the body 96. The cap 40 is then turned through approximately 90° to place the cap 40 in fully assembled relationship with the cap support assembly 34.

As noted previously, different lengths of the anchor bolt 24 may be required based upon the configuration of the toilet mounting portion 32 and the relationship between the top 20 of the closet collar flange 18 and the support surface 12. For example, in FIG. 6, the bottom 22 of the closet collar flange 18 is supported directly against the upper floor/support surface 12, whereas in FIG. 7, the bottom 22 of the closet collar flange 18 is supported by an offset surface 134 spaced below the support surface 12. As a result, a longer anchor bolt 24 is required in the FIG. 7 installation than that in FIG. 6.

One option is to provide anchor bolts 24 of different length but, as noted above, even doing so still may require cutting to effect shortening thereof to accommodate a cap.

As noted above, in one preferred form, the anchor bolt shank 28 is made from a non-metal material. As shown in FIGS. 24 and 25, a cutting tool 136 may be provided with an elongate flexible cutting element 137 doubled back on itself to form spaced gripping elements/loops 138. The loops 138 are maintained using crimped pieces 139. Soft, flexible tubes 140, 142 surround the gripping elements/loops 138 to facilitate comfortable gripping. The spaced gripping elements/loops 138 that can be held, one each in opposite hands, to allow the flexible cutting element 137 to be drawn back and forth against the anchor bolt shank 28, as indicated by the double-headed arrow 144. This action progressively abrades the non-metal material to eventually sever the shank 28 and thereby separate a discrete length thereof to redefine the free end region 132 at which the body 96 is threadably connected.

The flexible element 138 can be readily wrapped around the shank 28 in a "U" shape whereupon manipulation of the elongate flexible element 138 through the gripping elements 140, 142 can occur in a space distanced adequately from the toilet 10 that the cutting operation can be conveniently carried out without interference from the toilet 10.

In FIGS. 27-36, a modified form of the system 14 is shown at 14'.

The system 14' differs from the system 14 primarily by reason of a different configuration of the anchor bolt 24'. All other components in the system 14' can be the same as those shown in the system 14.

The anchor bolt 24[4'] consists of first and second joinable parts 146, 148. The first joinable part 146 defines an elongate shank 28' with external threads 82' to threadably engage the nut assembly 94 making up the cap support assembly 34, as in the system 14.

The second joinable part 148 defines a head piece 73' corresponding to the head piece 73 on the anchor bolt 28.

The first joinable part 146 has a stepped outer diameter with a smaller diameter length portion at 152 and a larger diameter length portion 154.

The smaller diameter length portion 152 is threaded to engage the nut assembly 94 that is part of the cap support assembly 34. The smaller diameter length portion 154 terminates in a proximal annular surface/edge 156 that faces axially downwardly.

A blind bore 158 is formed from the surface/edge 156 through the larger diameter length portion 154 and a short distance into the smaller diameter length portion 152. The bore 158 has internal threads 160 that engage external threads 162 on a post 164 fixed with respect to the head piece 73' and projecting axially upwardly therefrom.

With the second joinable part 148 threadably engaged with the first joinable part 146, a flat, axially facing surface 60', corresponding to the surface 60 on the anchor bolt 24, faces the surface/edge 156 defined by the larger diameter length portion 154.

With the first and second joinable parts 146, 148 threadably engaged with each other, the resulting anchor bolt 24' has essentially the same "T bolt" configuration as the anchor bolt 24 and functions in substantially the same manner in terms of being connected to the closet collar 16. The primary difference is that the larger diameter length 154, and the surface/edge 156 thereon, perform the stabilizing function of the separate, dedicated stabilizing component 78 in the system 14.

Figure 7:
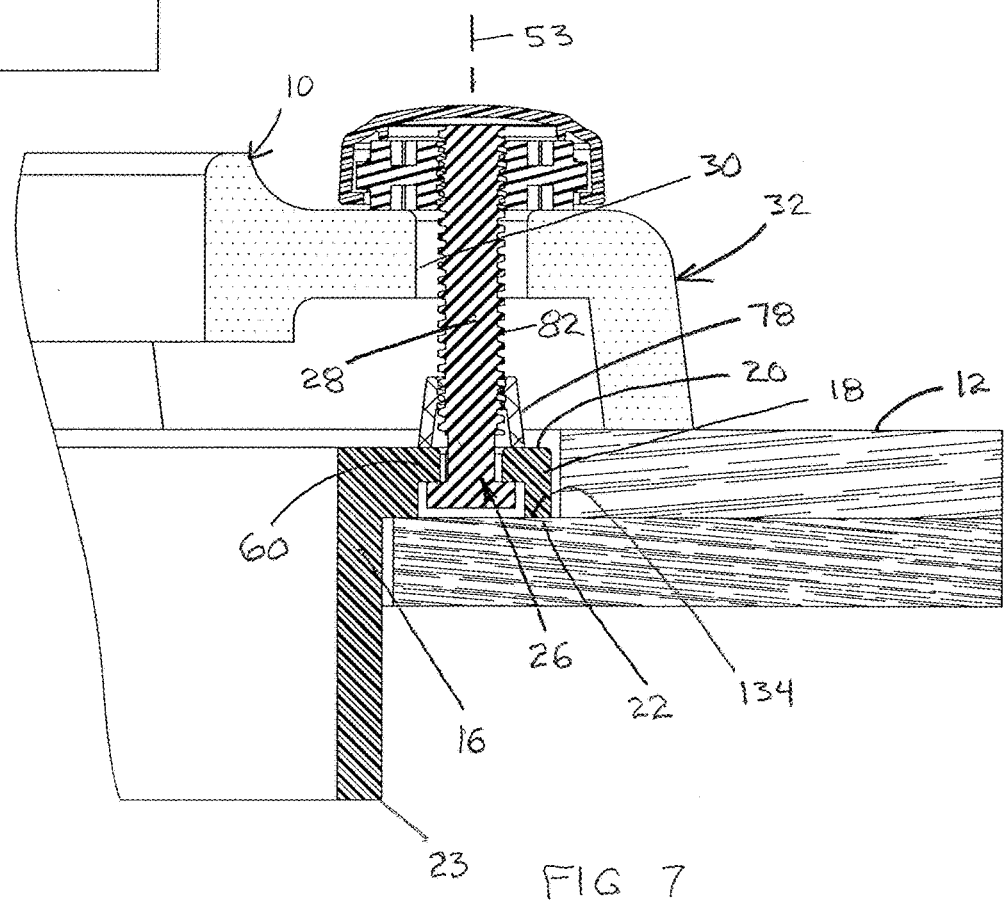
FIG. 7 is a view as in FIG. 6 wherein a closet collar on the system is at a different vertical location relative to a support surface for the toilet than in FIG. 6.
Figure 8:
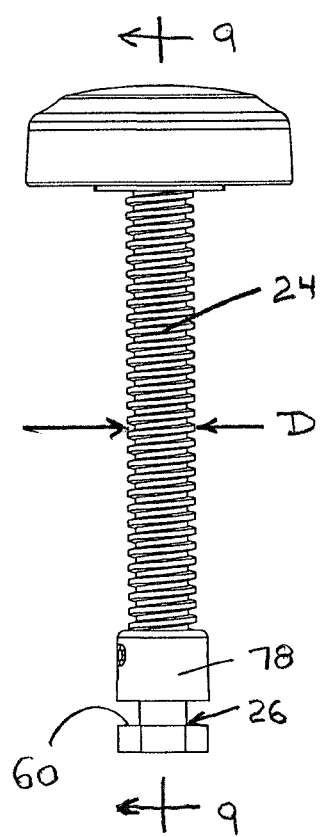
FIG. 8 is a side elevation view of the assembled components in FIG. 4.
Figure 28:
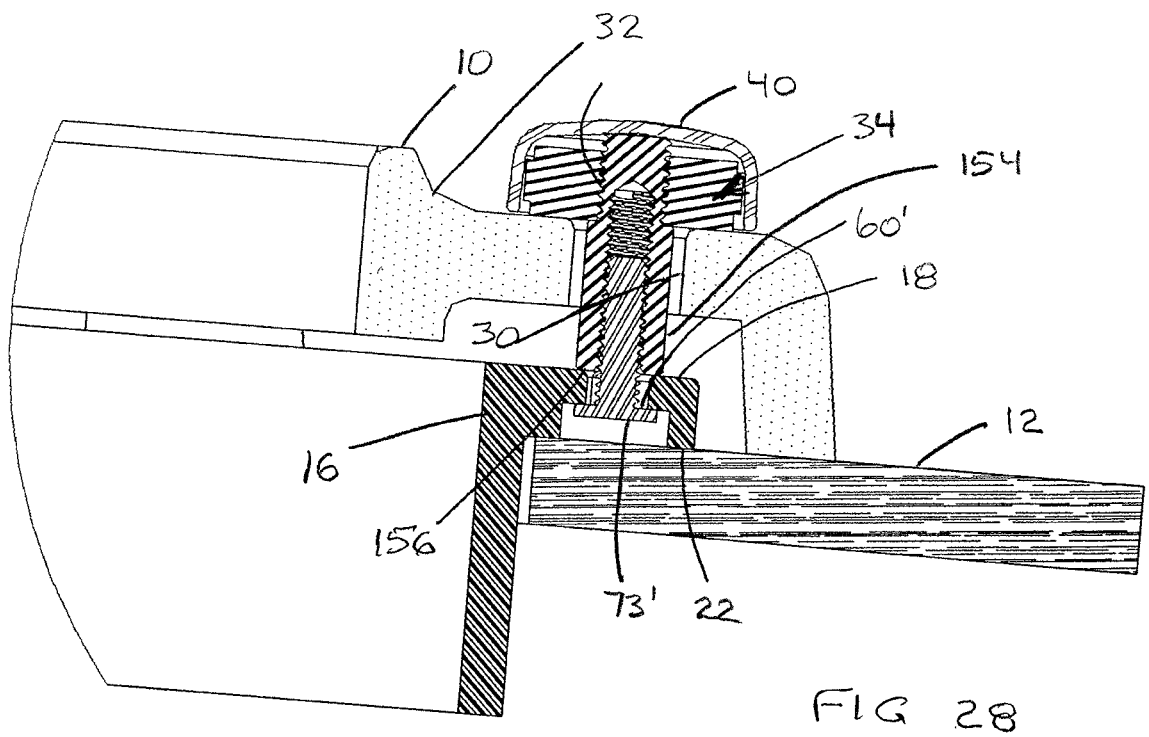
FIGS. 28 and 29 correspond respectively to FIGS. 6 and 7 and with the modified system in FIGS. 26 and 27 mounting the toilet to the support surface.
Figure 29:
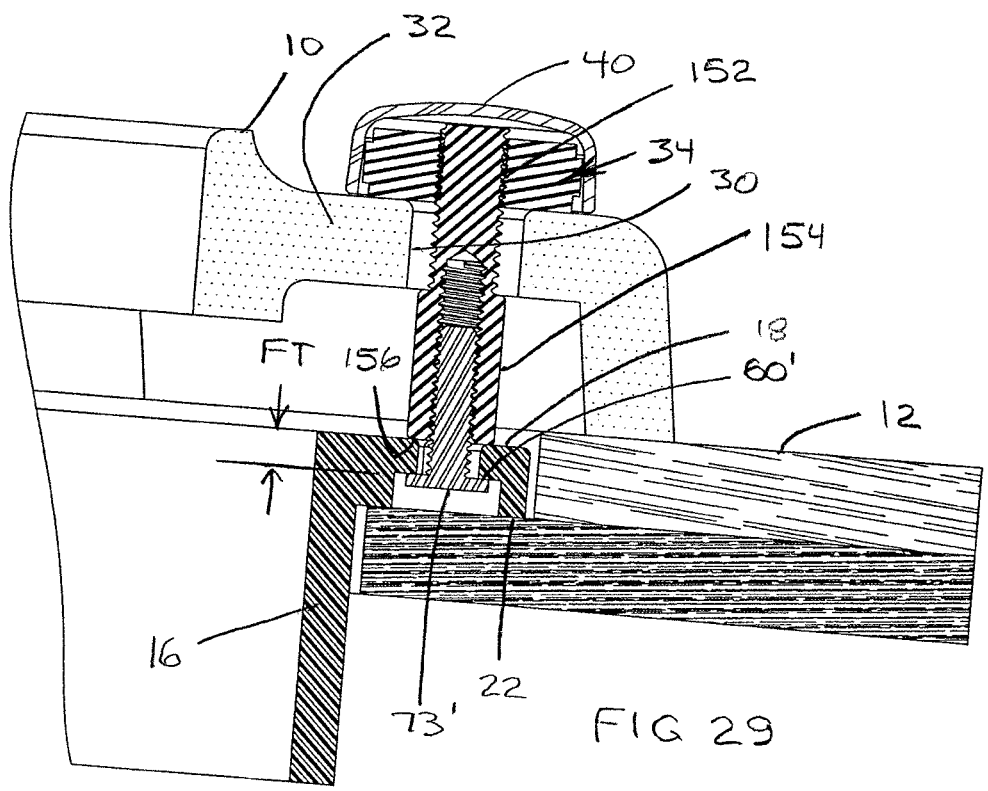
Figure 30:
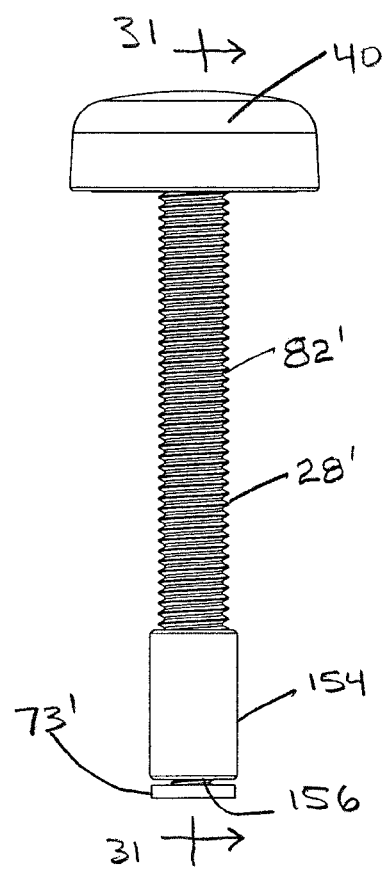
FIG. 30 is a side elevation view of the components in FIG. 27.
Figure 31:
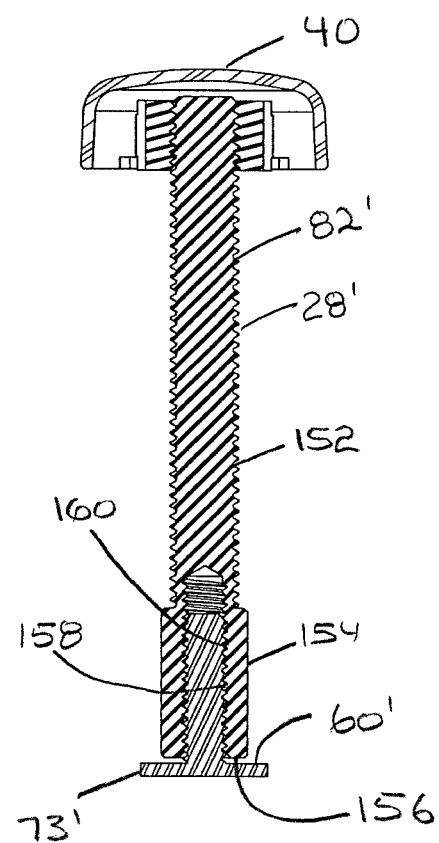
FIG. 31 is a cross-sectional view of the components taken along line 31-31 of FIG. 30.
Figure 33:
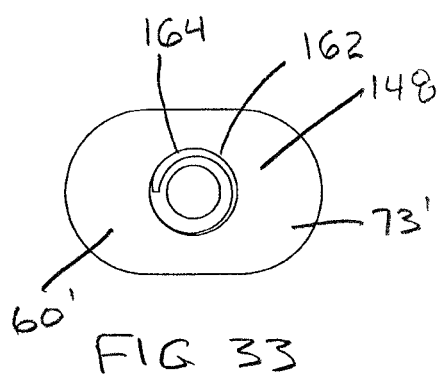
FIG. 33 is a plan view of the component in FIG. 32.
Figure 32:
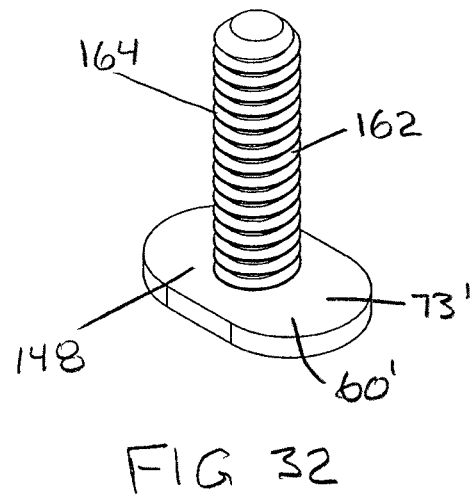
FIG. 32 is an enlarged, perspective view of one of two joinable parts making up the anchor bolt in FIGS. 27-31.
Figure 34:
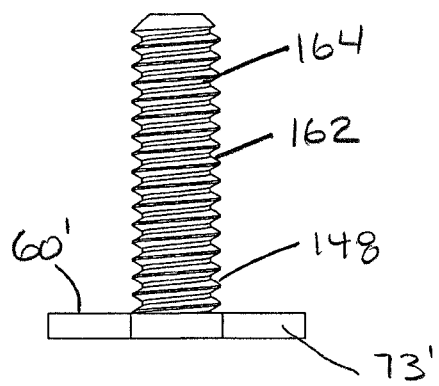
FIG. 34 is a side elevation view of the component in FIGS. 32 and 33.
Figure 35:
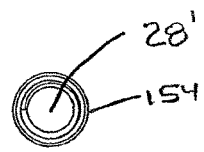
FIG. 35 is a plan view of the component joined to the components in FIGS. 32-34 to make up the anchor bolt.
Figure 36:
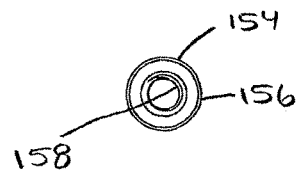
FIG. 36 is a bottom view of the component in FIG. 35.

As seen in FIGS. 28 and 29, corresponding respectively to FIGS. 6 and 7, the anchor bolt 24' is stabilized by causing the flange 18 on the closet collar 16 to be captured between the head surface 60' and the surface/edge 156.

The anchor bolt 24' can be engaged with the closet collar flange 18 by initially engaging the first and second joinable parts 146, 148 in a manner that the spacing between the surface 60' and surface/edge 156 is slightly greater than the flange thickness FT (FIG. 29). This allows the head piece 73' to be directed into the key slot 54 and translated therealong, after which the first joinable part 146 can be turned to eventually tightly capture the closet collar flange 18 between the surface 60' and surface/edge 156.

In a preferred form, the first joinable part 146 is made at least partially from a non-metal material and the second joinable part 148 is made from a metal material. The metal material of the second joinable part 148 strengthens the same against failure with the nut assembly 94 tightened and a substantial tensile force being exerted upon the post 164.

While no specific, critical material limitations are intended, the metal/non-metal combination facilitates severance of the free end region 38' of the elongate shank 28', as described above. The larger diameter length portion 154 accommodates the threaded post 164 and has a large enough diameter that it is not significantly weakened by the bore 158.

As noted above, FIGS. 28 and 29 show the bottom 22 of the closet collar flange 18 mounted at the level of the support surface 12 and below the support surface 12, corresponding to the site conditions in FIGS. 6 and 7, respectively.

As noted, the cap support assembly 34 and cap 40 are connected to each other and the anchor bolt 24' in the same manner that these same components are connected to the anchor bolt 24.

In FIGS. 37-44, a modified form of cap is shown at 40", usable with either form of the anchor bolt 24, 24', or another form thereof, in combination with the nut assembly 94.

The cap 40" is configured to be snap fit into assembled relationship with the cap support assembly 34.

The cap 40" has a top wall 106" and a peripheral wall 108" cooperatively producing an inverted cup-shaped configuration.

Arcuate rim portions 112a", 112b" extend radially inwardly from the peripheral wall 108". The rim portions 112a", 112b" have the same configuration. Dividing walls 168, 170 span spaced portions of the peripheral wall 108" and respectively have substantially flat surfaces 172, 174 which are substantially parallel to each other and bound a receptacle 110" within the volume bounded cooperatively by the cap 40" and peripheral wall 108".

The surfaces 172, 174 are spaced a distance slightly greater than the width of the body 96 on the nut assembly 94, which is identified by the dimension BW in FIG. 18. This allows the nut assembly 94 to be axially aligned with the cap 40" and directed into the receptacle 110" without significant, or any, interference between the body 96 and the surfaces 172, 174.

The diametrically opposite rim portions 112a", 112b" are mirror images of each other. The exemplary rim portion 112a" has a circumferential gap/interruption 176 formed therein, thereby producing separate tab portions 178, 180 which can be independently flexed/bent.

The tab portions 178, 180 have surface/edge portions 182, 184, respectively, that cooperatively define a surface/edge 44a" corresponding to the surface/edge 44a on the cap 40.

The rim portions 112a", 112b" are dimensioned and configured so that they each cooperate with one of the radially projecting portions 102a, 102b of the nut assembly 94 in like fashion. Thus, explanation of this interaction will be limited to the exemplary cooperating radially projecting portion 102a and the arcuate rim portion 112a".

With the nut assembly 94 and cap 40" in axially aligned relationship and initially spaced from each other, the nut assembly body 96 can be advanced into the receptacle 110". As this occurs, a corner 190 on the arcuate rib 116a engages inclined surface portions 186, 188 on the tab portions 178, 180. Continued axial movement in the direction of the arrow 192 in FIG. 39 produces a caroming action between the corner 190 and the inclined surface portions 186, 188 to thereby progressively flex/bend the tab portions 178, 180, in a manner as shown for the exemplary tab portion 180 in FIG. 39, from the solid line position therein to the dotted line position. This allows the surface/edge 42a on the nut assembly 94 to move axially up to and beyond the surface/edge 44a" on the cap 40". Once the surface/edge 42a moves axially beyond the surface/edge 44a", the tab portions 178, 180, under residual forces generated therein, bend back and assume their original, undeformed states, which places the surfaces/edges 42a, 44a" in confronting relationship.

The radially projecting portion 102b cooperates with the rim portion 112b" in like fashion.

Accordingly, the cap 40" can be axially aligned with the nut assembly 94 and snap fit into place. The wall surfaces 172, 174 cooperate with the nut assembly body 96 to key the nut assembly body 96 and cap 40" against relative angular movement around the shared axis 53.

Aside from defining a receptacle shape complementary to the nut assembly body 96, the walls 168, 170 also distribute squeezing forces, applied at diametrically opposite locations as indicated by the arrows 196, 198, so as to cause the cap 40" to assume a more oval shape with a major axis 200 spanning the arcuate rim portions 112a", 112b". Effectively, the cap 40" bulges at diametrically opposite regions 202, 204, thereby shifting the arcuate rim portions 112a", 112b" away from each other adequately that the nut assembly body 96 can be drawn axially away from the cap 40" without interference between the previously confronting surfaces/edges—as with exemplary surfaces/edges 44a" on the cap 40" and surface/edge 42a on the cap support assembly 34.

As explained in the Background section herein, closet collars are commonly compromised either over time, during the assembly process, or during a repair procedure, as when a toilet is re-mounted. As an alternative to replacing the closet collar, it is known to use a repair flange that becomes integrated into the existing closet collar.

An exemplary form of repair flange, according to the invention, is shown at 206 in FIGS. 45-53. The depicted repair flange 206 has a ring-shaped body 208 with a top surface 210 and a bottom surface 212.

The body 208 has an annular depending edge 214 defining the inside ring dimension and an outer depending edge 216. The inclusion of the edges 214, 216 rigidifies the body 208 to maintain the shape thereof.

The body 208 can be made from a metal or a non-metal material. In a preferred form, the body 208 is made from one of stainless steel, cold-rolled steel, etc., and may have a protective coating, such as an e-coating. Other coating or types of coatings may be utilized to prevent rust and maintain appearance.

The body 208 has a plurality of arcuate undercuts 218a, 218b, 218c, 281d circumferentially spaced around the body axis 53. The undercuts 218 further rigidify the body 208.

Each of the undercuts 218 is shown to have a similar construction, which is not a requirement. The exemplary undercut 218a has a bottom wall portion 220 with openings 222 therethrough, each to accept a fastener 224, as in the form of a screw, extendable through the opening 222 and into the support surface 12. The undercut arrangement allows the heads of the fasteners 224 to be flush, or near flush, with the top surface 210 on the body 208.

The openings 222, and additional openings 226, 228 are provided through the body 208 to allow the fasteners 224 to be directed through the body 208 either directly into the surface 12, or through an intermediate existing closet collar flange 18, as shown in FIG. 52. The openings 222, 226, 228 can be strategically placed to align with existing openings in the already present flange 18, whereby fasteners used to fix the flange 18 can be removed and replaced by fasteners that extend through aligned openings through the repair flange body 208 and flange 18.

To seal between the bottom surface 212 of the body 208 and the top 20 of the existing flange 18, a ring-shaped sealing component 230 is provided. The sealing component 230 may take many different forms. As one example, the sealing component 230 may be a foam gasket.

While the sealing component 230 may be provided to a purchaser separately from the repair flange body 208, in one form, the sealing component 230 is adhered to the bottom surface 212 of the body 208. This avoids a situation where a consumer might inadvertently omit any type of sealing component, whereby an escape path for sewer gases is present between the repair flange 206 and the existing flange 18. The use of a foam gasket material potentially provides for an airtight seal between the repair flange 206 and the existing flange 18.

Exemplary forms of flexible material suitable for the construction of the sealing component 230 are EVA, TPR, TPE, TPU, PVC, SBR, EPDM, neoprene, rubber, glue, wax, gel, or foam material like EVA, neoprene, silicone, PVC, PE foam, PU foam, or other open or closed cell foams known in the art or devisable by one skilled in the art.

The depicted repair flange 206 is constructed to be adapted to the anchor bolts 24, as described in prior embodiments.

FIG. 48 shows a cross-sectional view of the anchor bolt 24 as shown in FIG. 9. As viewed from the distal end of the anchor bolt 24, the threaded elongate shank 28 has a circular shape. The transition region produces diametrically opposite rectangular shapes 232a, 232b projecting diametrically oppositely from the axis 53 of the shank 28. The head piece 73 has a larger, rectangular, perimeter shape, as viewed from the FIG. 48 perspective.

To accommodate the anchor bolts 24, the repair flange body 208 has diametrically opposite through openings 234a, 234b, each to accommodate one of the anchor bolts 24. Each of the through openings 234 has a shape at least nominally matched to the cross-sectional shape of the shank 28 and rectangular shapes 232a, 232b, as seen in FIG. 48. As a result, the elongate shank 28 can pass freely through the openings 234a, 234b, whereupon the transition region 70 keys against the edges 236a, 236b bounding the openings 234a, 234b, respectively. As the keyed engagement between the transition region 70 and edges 236a, 236b takes place, the surface 60 on the head piece 73 abuts to the bottom surface 212 of the repair flange body 208.

At the same time, circumferentially facing surfaces/edges 238, 240 defined by adjacent arcuate undercuts 218 at the bottom of the body 208, confront spaced surfaces/edges 242, 244, respectively, on the head piece 73 to thereby effect further keying that stabilizes the anchor bolt 24 against turning within the openings 234a, 234b and relative to the body 208. The stabilizing component 78 can be engaged with the threaded shank 28 to further reinforce the respective anchor bolt 24.

The arcuate undercuts 218 each produces a bottom surface portion 246, that as depicted is co-planar with a bottom annular rim 248 defined by the edge 214 and a bottom annular rim 252 defined by the edge 216. This produces a depth HD between a plane P1 containing the surface portions 246 and rims 248, 250 and an underside surface portion 254 on a top wall portion 256 of the flange 206. The depth dimension HD is adequate to accept the axial dimension of the head piece 73 on the anchor bolt 24, whereby the head piece 73 does not extend below, or significantly below, the plane P1. With the body 208 overlying the support surface 12 on the closet collar flange 18, the head piece 73 is vertically captively held.

Separate anchor bolts 24 can be operatively connected to the repair flange 206 at diametrically opposite locations thereon, as shown in FIGS. 50-52 and 54-56.

The repair flange 206 with the attached anchor bolts 24 is then aligned with the existing flange 18 and secured by fasteners 224 extending through the repair flange 206, the flange 18 on the closet collar 16, and into the support 12.

A separate seal 258, shown as a ring-shaped component, made commonly from wax, is axially aligned with the repair flange 206 and placed against the top surface 210 of the repair flange 206. The toilet 10 is then lowered to allow the anchor bolts 24 to be directed through the openings 30 on the mounting portion 32 of the toilet. The protruding portions of the anchor bolts 24 can be engaged with components as described above to fix the toilet 10 with respect to the support 12.

A modified form of repair flange is shown at 206''' in FIGS. 57-68.

The repair flange 206''' has a body 208''' having circumferentially spaced, arcuate undercuts 218a''', 218b''' corresponding to the arcuate undercuts 218 on the repair flange 206. Appropriate fasteners are directed through openings 222''' within the undercuts 218a''', 218b''' to fix the body 208''' to an underlying closet collar or support surface, as previously described.

The body 208''' has through openings 234a''', 234b''' to accommodate anchor bolts 24, 24' in the same manner as the aforementioned openings 234a, 234b on the repair flange 206.

Instead of providing a separate sealing component, such as the sealing component 230, at the bottom of the body 208''', a suitable sealing material is molded over the body 208''' to define a sealing configuration/component 230''' performing the function of the sealing component 230 on the repair flange 206.

Radially inside of the arcuate undercuts 218a''', 218b''' on the body is an annular wall 264 with a substantially flat profile including a radially inside annular portion 266 that is substantially uninterrupted, and a radially outside annular portion 268 having circumferentially spaced openings 270 therethrough.

Forming molds are configured so that the material of the sealing component 230''' produces an annular body 272 with a stepped axial thickness. The body 272 extends radially inwardly from an inside edge 274 of the body 208''' to produce a bead portion 276 with a radial dimension RD.

The material of the body 272 flows into the openings 270 such that the thickness of the annular wall 264 becomes embedded in the material making up the body 272, with the top 278 of the wall on the body 208''' substantially flush with the top 280 of the body 272, as seen clearly in FIG. 59.

The bottom 282 of the body 272 has a stepped configuration with an axially thickened region at 284 defined by a plurality of concentric, annular ribs 286, which are radially spaced from each other to provide relief volumes that facilitate compression of the ribs 286 so that they might create a positive seal with a surface against which the ribs 286 are placed.

The ribs 286 may be the primary sealing structure or, alternatively, an additional sealing component may be placed between the ribs 286 and a cooperating surface, as on a support surface or an underlying flange on a closet collar in the event the repair flange 206''' is used in conjunction with a pre-existing closet collar.

The invention also contemplates that a component might be over-molded to produce a sealing component configuration performing the function of the component 258 used in conjunction with the repair flange 206.

In FIGS. 69-74, a modified form of the cutting tool 136, as shown in FIGS. 24 and 25, is shown at 136$^{4'}$.

The basic function of the cutting tool 136$^{4'}$ is substantially the same as that of the cutting tool 136.

The cutting tool 136$^{4'}$ has an elongate flexible cutting element 137$^{4'}$ and spaced gripping elements/loops 138$^{4'}$ that can be held, one each in opposite hands, to allow the flexible cutting element 137$^{4'}$ to be drawn back and forth against an anchor bolt shank, as described using the cutting tool 136 in FIG. 25.

Instead of lengthening the cutting element 137$^{4'}$ adequately to allow it to be doubled back upon itself to form the gripping elements/loops 138$^{4'}$, ring-shaped bodies 290 are attached to a length of the elongate flexible cutting element 137$^{4'}$.

More specifically, each of the bodies 290 has a connector 292, configured to cooperate with one of like connectors 294 at spaced ends of the flexible cutting element 137$^{4'}$. The connectors 292 may be integrally formed with a respective body 290 or separately attached thereto.

Each connector 294, while not required to be the same, has a cylindrical body 296. To join the connectors 292, 294, the cutting element 137$^{4'}$ is locally bent so that the body 296 rests against the elongate flexible cutting element 137$^{4'}$, as shown in dotted lines in FIG. 70, with the axis 297 of the cylindrical body 296 generally parallel to the abutted length of the cutting element 137$^{4'}$. In this assembly state, the abutting body 296 and elongate flexible cutting element 137$^{4'}$ collectively occupy an effective diameter slightly greater than the diameter BD of the body 296—increased by the diameter of the cutting element 137$^{4'}$.

The connector 292 has a wall portion 298 with an opening 300 therethrough with an effective diameter CD slightly greater than the effective diameter of the abutted body 296 and flexible cutting element 137$^{4'}$.

The opening 300 is in communication with a cavity 302 bounded by a ramp surface 304 and a base surface portion 306 at the bottom of the ramp surface 304.

Figure 70:
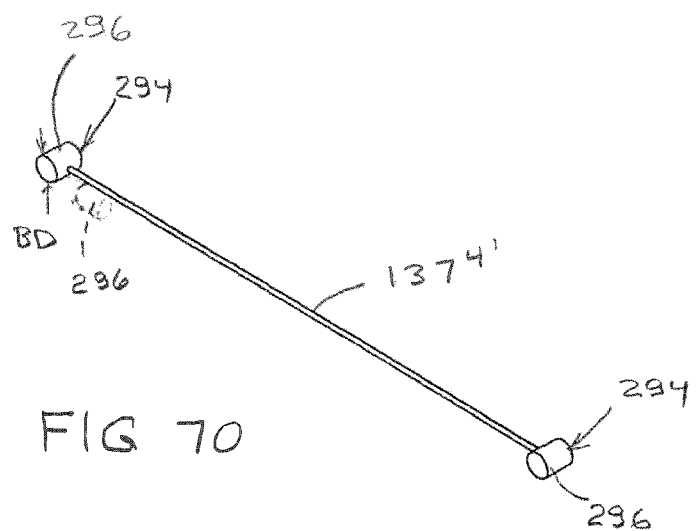
FIG. 70 is a perspective view of a separable, elongate, flexible cutting element making up part of the cutting tool in FIG. 69.
Figure 71:
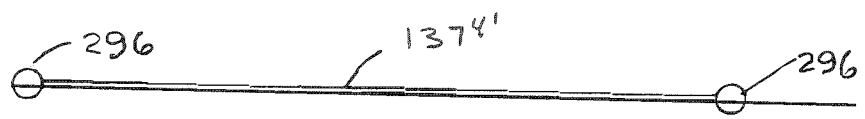
FIG. 71 is a side elevation view of the elongate flexible cutting element in FIG. 70.

The elongate flexible cutting element 137$^{4'}$, at least at the region where the body 296 is located, tends towards a relaxed state as shown in FIG. 70. By placing the body 296 in the dotted line position of FIG. 70, the body 296 and abutted length of the cutting element 137$^{4'}$ can be directed through the opening 300 in the wall portion towards the ramp surface 304. Once the body 296 resides fully within the cavity 302, the deforming pressure on the elongate flexible cutting element 137$^{4'}$ is released, whereupon the solid line state of FIG. 70 is reassumed, with the axis 297 of the cylindrical body 296 substantially orthogonal to the axis 310 of the opening 300.

By exerting a tensile force upon the elongate flexible cutting element 137$^{4'}$ in the direction of the arrow 312 in FIG. 74, the body 296 bridges the opening 300 at the wall portion 298 and exerts a pressure against a confronting surface 314 therearound.

Accordingly, the cutting tool 136$^{4'}$ lends itself to being used with a shorter elongate flexible cutting element 137$^{4'}$. At the same time, elongate flexible cutting elements with different constructions/makeup may be interchangeably connected to the spaced gripping elements/loops 138$^{4'}$, depending upon the particular cutting characteristics and cutting length desired.

The elongate flexible cutting element 137$^{4'}$ can be separated from the gripping elements/loops 138$^{4'}$ by reversing the assembly steps—by moving the body 286 to the dotted line position of FIG. 70 and drawing the connector 294 on the elongate flexible cutting element 137$^{4'}$ away from its respective gripping element/loop 138$^{4'}$.

As depicted, but not required, each body 296 fits loosely into its respective cavity 302. In the event that the body 296 shifts towards or upwardly along the ramp surface 304, reapplication of the force in the direction of the arrow 312 upon the elongate flexible cutting element 137$^{4'}$ causes the body 296 to be guided back into the FIG. 74 position.

In this embodiment, each of the bodies 290 is made with arcuate ribs 316a, 316b, 316c, 316d spaced around the central axis of the ring shape that, as depicted, produce a "T" shape in cross-section (see FIG. 74) and collectively provide positive gripping edges to facilitate manipulation of the cutting tool 136$^{4'}$.

Figure 75:
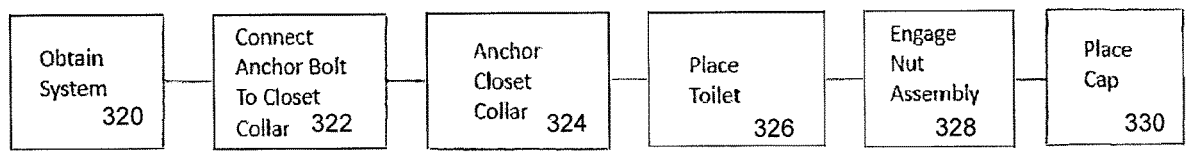
FIG. 75 is a flow diagram representation of a method of mounting a toilet to a support surface, according to the invention.
Figure 45:
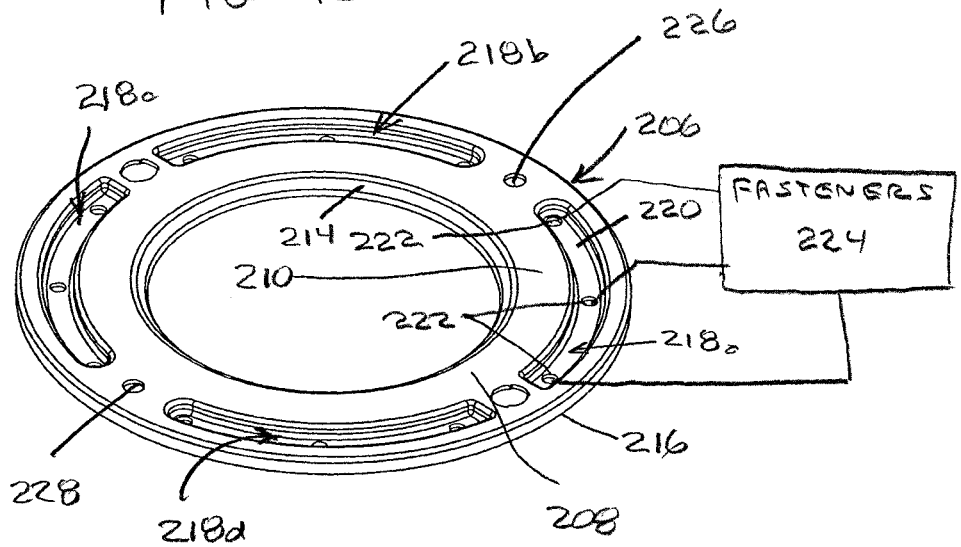
FIG. 45 is a top perspective view of a repair flange, according to the invention, usable as in conjunction with an existing closet collar flange.
Figure 46:
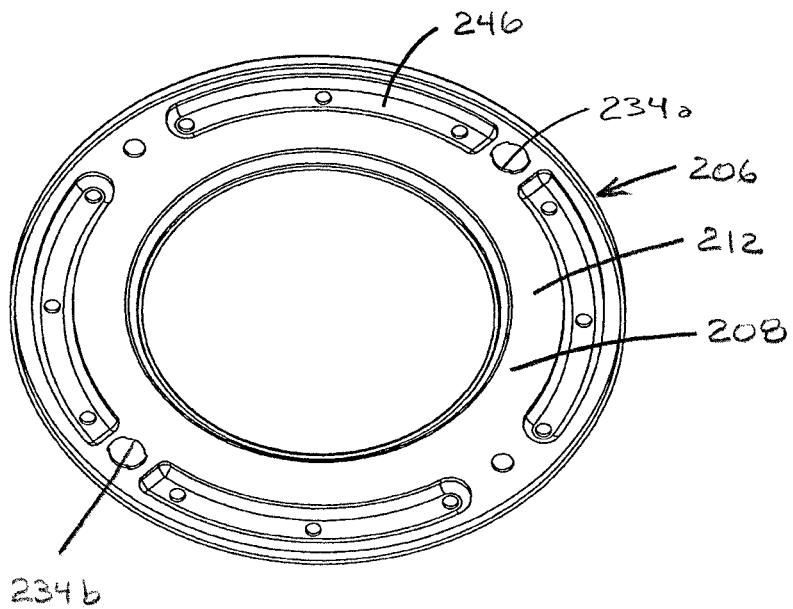
FIG. 46 is a bottom perspective view of the repair flange in FIG. 45.
Figure 50:
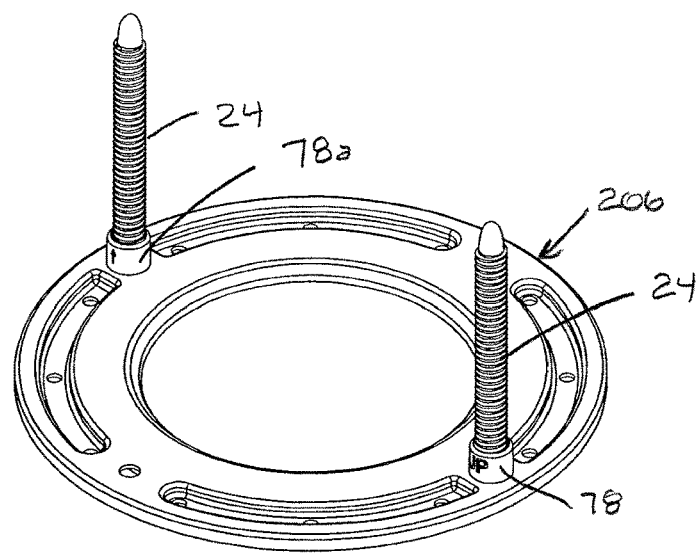
FIG. 50 is a view of the repair flange as in FIG. 45 with a pair of anchor bolts operatively connected thereto.
Figure 51:
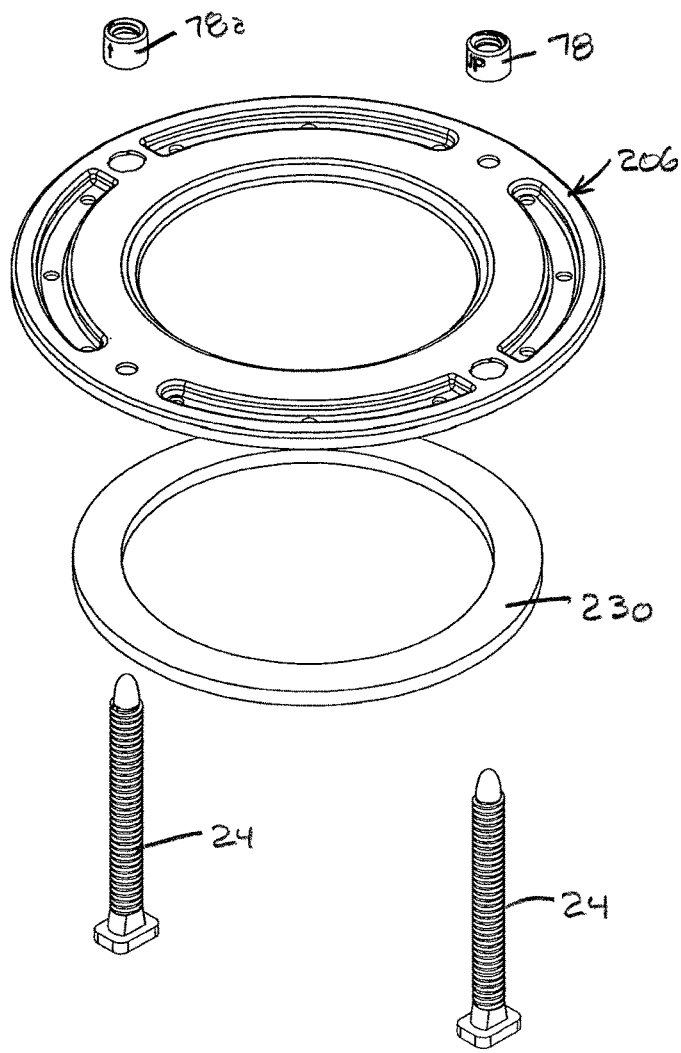
FIG. 51 is an exploded perspective view of the components in FIG. 50.
Figure 54:
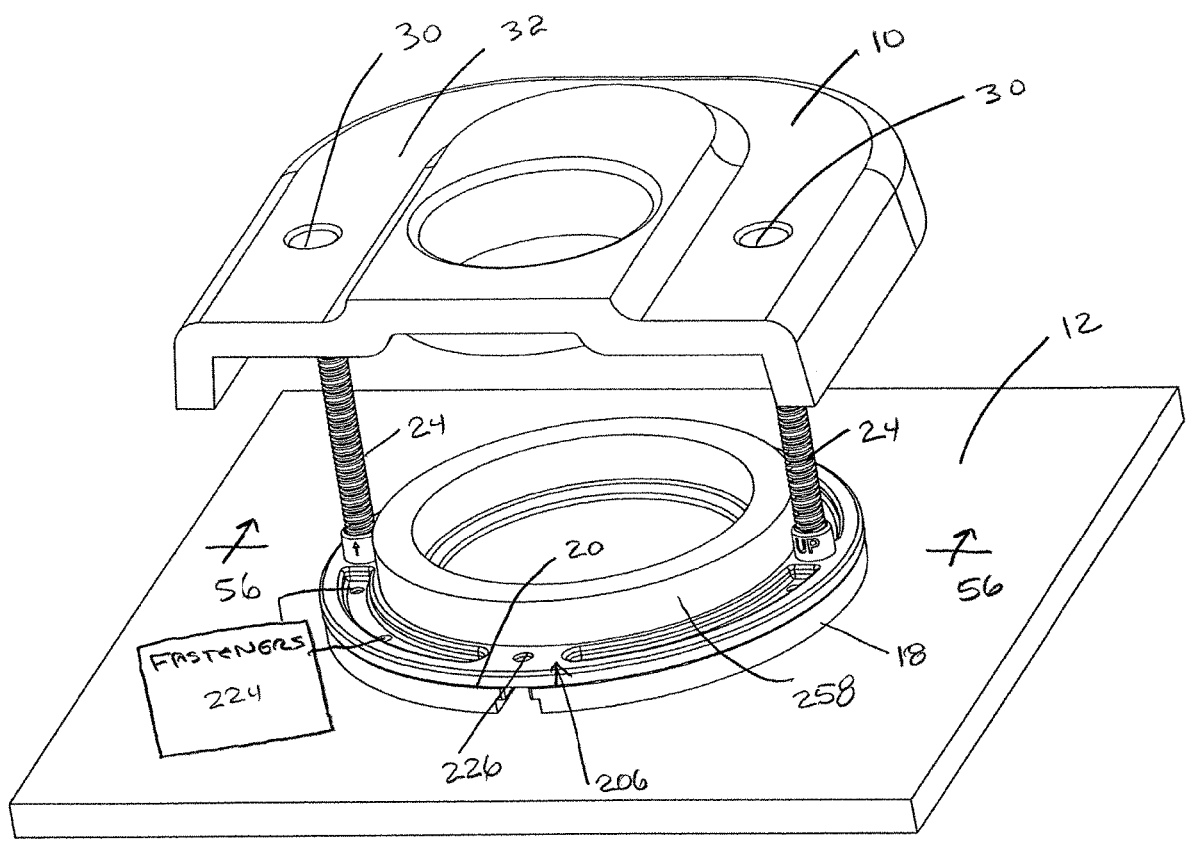
FIG. 54 is a fragmentary, partially exploded, perspective view showing the repair flange in FIGS. 45-53, with a seal component on the top thereof and anchor bolts operatively connected thereto, and fixed to an existing closet collar in relationship to a mounting portion of a toilet spaced above a support surface for the toilet.
Figure 55:
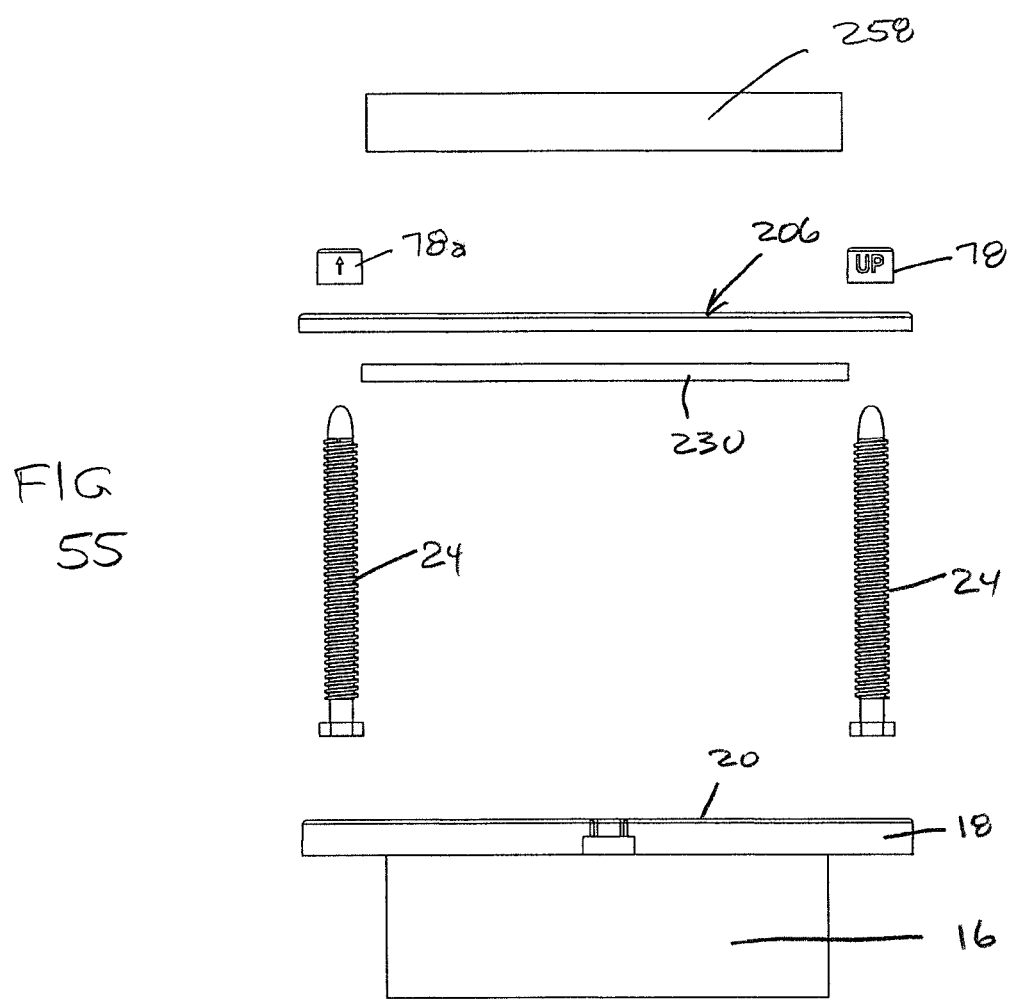
FIG. 55 is an exploded view of the components in FIG. 54.
Figure 57:
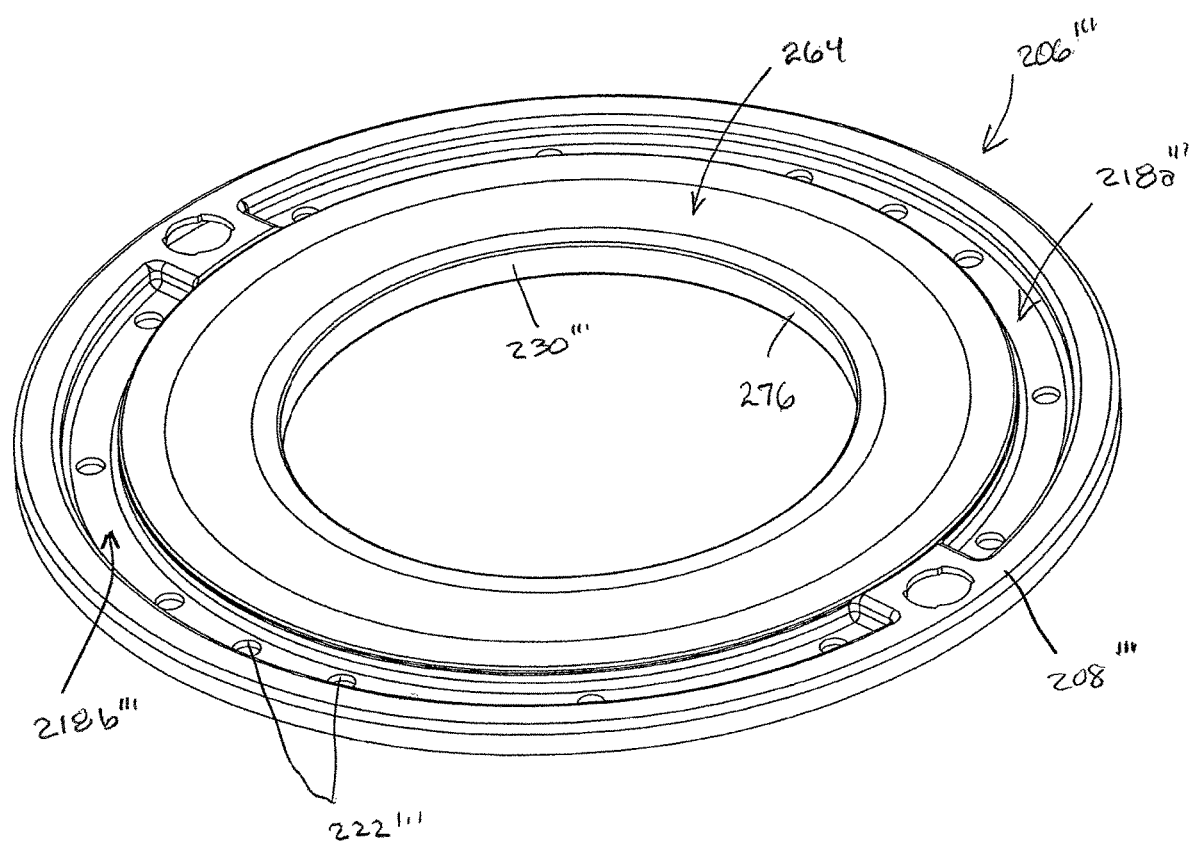
FIG. 57 is a top perspective view of a modified form of repair flange, according to the invention, and having a body with an over-molded sealing component.
Figure 61:
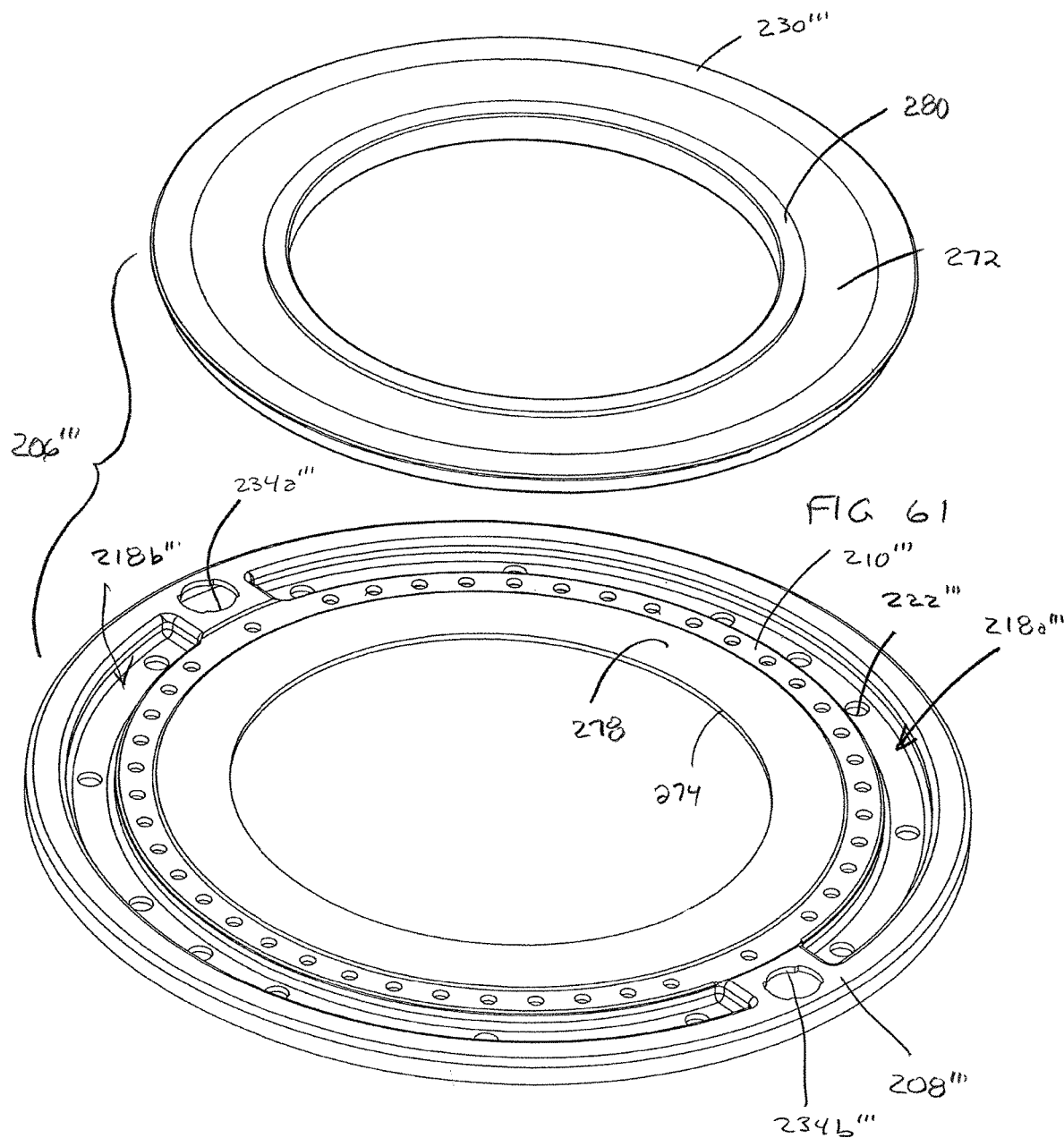
FIG. 61 is an exploded perspective view of the repair flange body and over-molded sealing component as shown in FIGS. 57-60.
Figure 62:
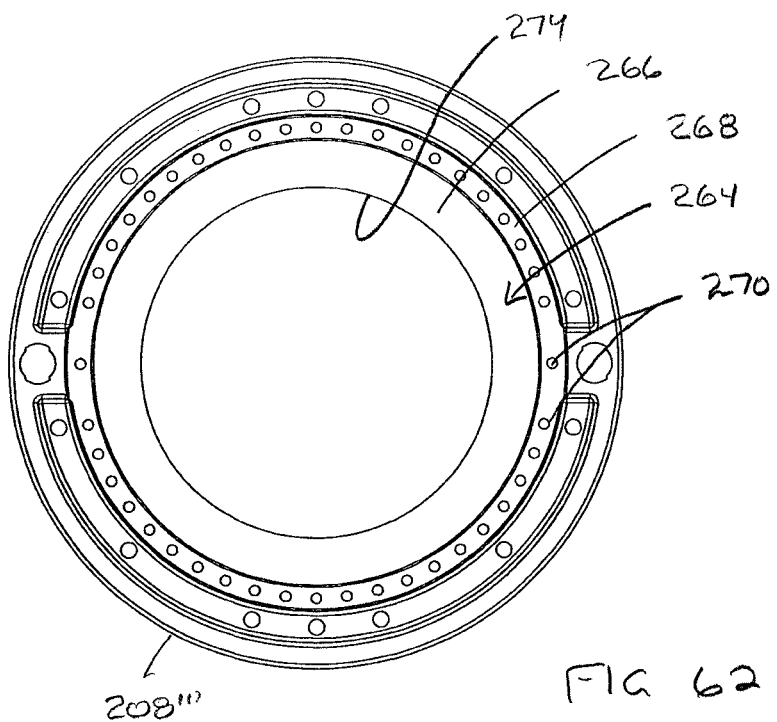
FIG. 62 is a top view of the body on the repair flange in FIGS. 57-61.
Figure 63:
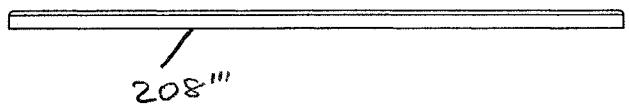
FIG. 63 is a side elevation view of the body in FIG. 62.
Figure 64:
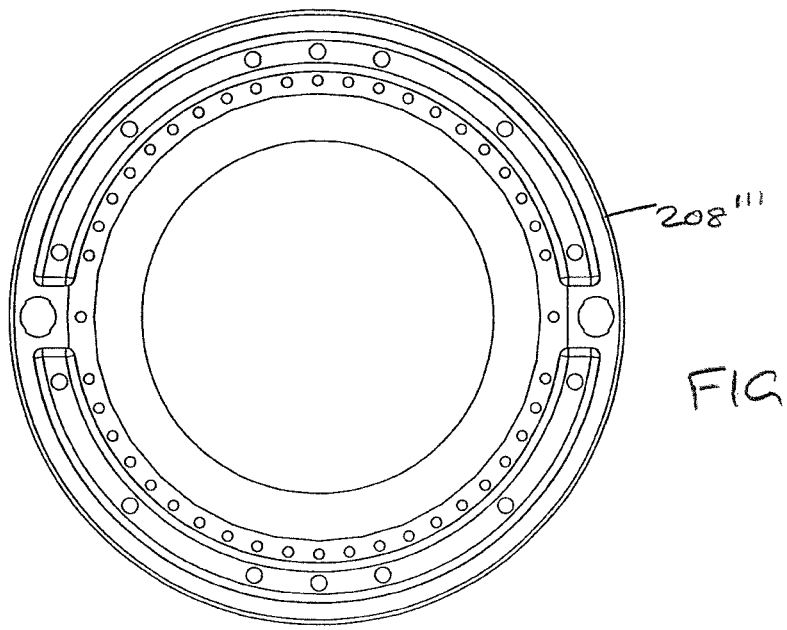
FIG. 64 is a bottom view of the body in FIGS. 62 and 63.
Figure 65:
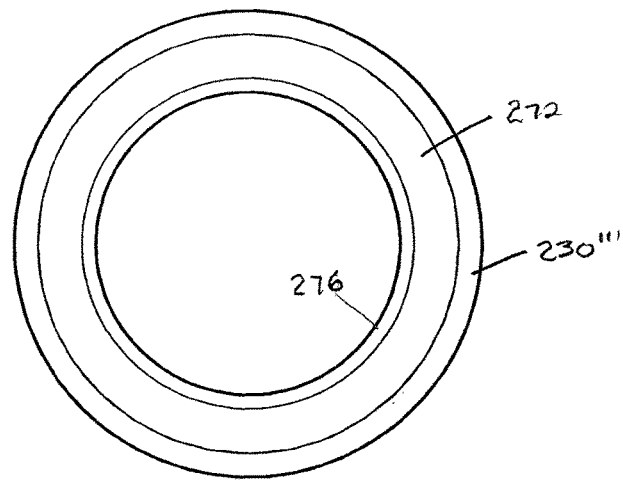
FIG. 65 is a plan view of the sealing component on the repair flange in FIGS. 57-61.
Figure 66:
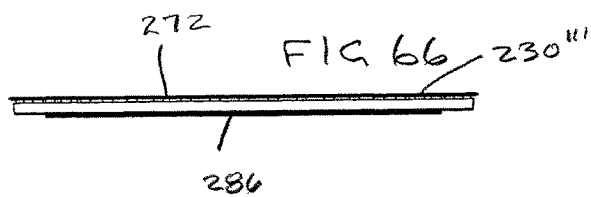
FIG. 66 is a side elevation view of the sealing component in FIG. 65.
Figure 67:
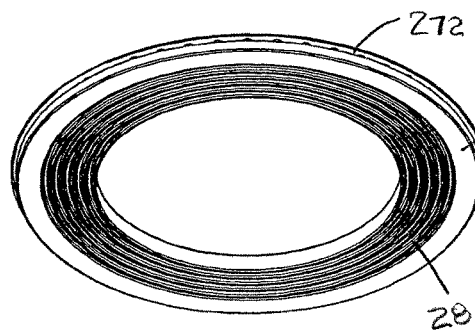
FIG. 67 is a bottom perspective view of the sealing component in FIGS. 65 and 66.
Figure 68:
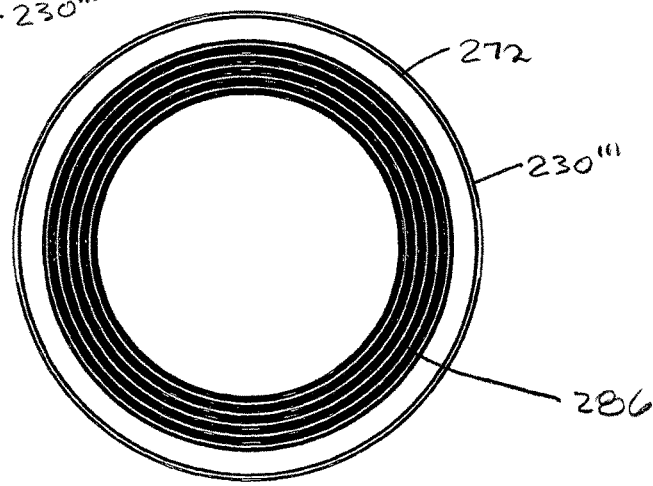
FIG. 68 is a bottom view of the sealing component in FIGS. 65-67.
Figure 69:
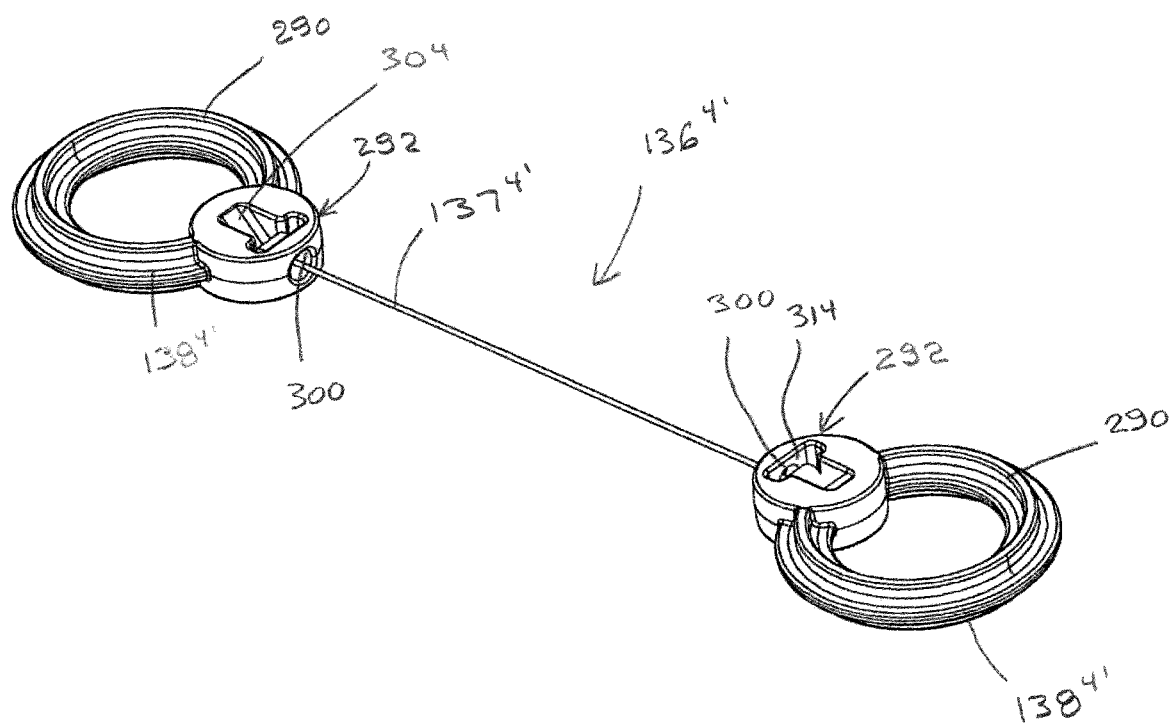
FIG. 69 is a perspective view of an alternative form of cutting tool, corresponding to that in FIG. 24.

A method of mounting a toilet to a support surface according to the invention is shown in flow diagram form in FIG. 75.

As shown at block 320, a system, as described above, is obtained.

As shown at block 322, the anchor bolt is operatively connected to the closet collar. This may be done on site or the anchor bolt may be integrally formed with the closet collar.

As shown at block 324, the closet collar is anchored relative to the support surface for the toilet.

As shown at block 326, the toilet is directed towards the support surface so that the anchor bolt elongate shank is directed upwardly into a through opening on a mounting portion of the toilet and so that the free end region of the anchor bolt elongate shank projects to above a top surface of the mounting portion of the toilet.

As shown at block 328, the nut assembly body is engaged with the free end region of the anchor bolt shank and positioned to cause the nut assembly body to directly or indirectly exert an axial force on the top surface of the mounting portion of the toilet to thereby place the nut assembly body in a fully connected position.

With the nut assembly body in a fully connected position, the cap is placed in the fully assembled relationship with the cap support assembly as shown at block 330.

The method may further include a step of severing the anchor bolt elongate shank to remove a discrete length thereof to redefine the free end region of the anchor bolt shank.

This severing step may be carried out as described above using the cutting tool 136, the cutting tool 136⁴', or a different tool.

The anchor bolt portions made from a non-metal material may be made from nylon or other material. With the anchor bolt 24, the head portion 26 can be integrally molded with the shank 28.

The stabilizing component 78 usable with the anchor bolt 24 will preferably have a height and width limited to approximately 0.5 inches to avoid projection above the surface 46 of the mounting portion 32 of the toilet 10 where it could potentially interfere with the nut assembly 94 threadably engaged with the shank 28.

A wider dimension might not pass without interference into the opening 30 on the mounting portion 32 of the toilet.

The nut assembly 94 may be made from a reinforced nylon material, acetol, POM, EBS, or other plastic or metal materials. The elongate flexible element 137 on the cutting tool 136, as with the elongate flexible element 137⁴' on the cutting tool 136⁴', may be a wire component with an abrasive bonded thereto via electroplating, glue, or other method of attaching abrasive. The abrasive can be diamond, carbide, or other type of abrasive. The wire can be braided or single strand. Braiding can be used to vary the thickness of wire and provide texture to improve cutting action. The wire can also be a single wire or braided strands of steel, copper, brass, stainless, or other materials that can withstand the pull force and friction while cutting.

As shown in FIG. 25, wire can be braided in a way that it creates a ridge R extending along the length thereof. The apex of the ridge R provides a rougher surface than standard straight braided wire, functioning similarly to a toothed cutting edge on a saw blade.

With the cutting tool 136, the gripping elements 140, 142 may have rubber plastic tubes or handles to provide extra comfort to the hands or fingers of the user during cutting operation. The wire can be coupled together near the loop connections with a crimp fitting 144 to hold each end of the wire around the loop. The act of pulling the wire back and forth across the bolt provides friction, allowing the wire to pull through the bolt and therefor cutting the bolt to a desired height.

The cap may be made from plastic material, such as polypropylene, ABS, or other plastic. Alternatively, it could be produced in a porcelain or metal material, as can be appreciated.

The anchor bolts can be made from nylon, polyamide, thermal plastic urethane (TPU), isoplast, or other suitable materials. The material may be 10-40% glass filled for added strength. Any of the non-metal materials described above may be used for any of the component parts that are made from a non-metal material.

The foregoing disclosure of specific embodiments is intended to be illustrative of the broad concepts comprehended by the invention.

The invention claimed is:

1. In combination:
   a closet collar having a flange with a top and bottom and configured to be anchored relative to a support surface upon which a toilet is to be mounted;
   an anchor bolt having a head portion and an elongate shank,
   the anchor bolt elongate shank extending away from the anchor bolt head portion and having a lengthwise axis,
   the anchor bolt configured to be operatively connected to the closet collar,
   the anchor bolt and closet collar configured so that with the anchor bolt operatively connected to the closet collar: a) at least a part of the anchor bolt elongate shank projects to above the top of the closet collar flange to allow the at least part of the anchor bolt elongate shank to be passed into an opening in a mounting portion of a toilet being mounted; and b) the anchor bolt head portion bears against the closet collar flange to prevent the anchor bolt from being drawn axially upwardly and to away from the closet collar flange;
   a cap support assembly that is engageable with the anchor bolt elongate shank adjacent a free end region of the anchor bolt elongate shank; and
   a cap,
   there being cooperating components on the cap and cap support assembly that are engageable to maintain the cap in assembled relationship with the cap support assembly, wherein the cap cannot be separated from the cap support assembly by exerting a force upon the cap along the lengthwise axis of the anchor bolt elongate shank,
   the cap support assembly and anchor bolt configured to cooperate so that at least part of the cap support assembly can be maintained in a plurality of different positions along the lengthwise axis of the anchor bolt elongate shank,
   the cap support assembly comprising a nut assembly body that is threadably engaged with the anchor bolt elongate shank,
   the cooperating component on the cap support assembly formed on the nut assembly body.

2. The combination according to claim 1 wherein the anchor bolt elongate shank has a threaded length, the cap has an axis that is substantially parallel to the lengthwise axis of the anchor bolt elongate shank with the cap support assembly engaged with the anchor bolt and the cap in assembled relationship with the cap support assembly, the nut assembly body threadably engageable with the threaded length of the anchor bolt elongate shank, wherein the cooperating components on the cap and cap support assembly comprise at least one surface/edge on the cap that confronts at least one surface/edge on the nut assembly body to block movement of the cap axially away from the cap support assembly with the cap in assembled relationship with the cap support assembly.

3. A method of mounting a toilet to a support surface, the method comprising the steps of:
   obtaining the combination of claim 2;

operatively connecting the anchor bolt to the closet collar;

anchoring the closet collar relative to the support surface;

placing the toilet on the support surface so that the anchor bolt elongate shank is directed upwardly into a through opening on a mounting portion of the toilet so that the free end region of the anchor bolt elongate shank projects to above a top surface of the mounting portion of the toilet;

threadably engaging the nut assembly body with the free end region of the anchor bolt elongate shank and thereby causing the nut assembly body to directly or indirectly exert an axial force on the top surface of the mounting portion of the toilet, to thereby place the nut assembly body in a fully connected position; and with the nut assembly body in a fully connected position, placing the cap in the fully assembled relationship with the cap support assembly.

4. The method of mounting a toilet to a support surface according to claim 3 further comprising the step of severing the anchor bolt elongate shank to separate a discrete length of the anchor bolt elongate shank and redefine the free end region of the anchor bolt elongate shank.

5. The method of mounting a toilet to a support surface according to claim 4 wherein the anchor bolt elongate shank has a length portion that is made from a non-metal material and the step of severing the anchor bolt elongate shank comprises severing the length portion of the anchor bolt elongate shank made from a non-metal material.

6. The method of mounting a toilet to a support surface according to claim 5 wherein the step of severing the length portion of the anchor bolt elongate shank comprises wrapping a flexible element around the length portion of the anchor bolt elongate shaft and moving the flexible element back and forth against the length portion of the anchor bolt elongate shank to progressively abrade the length portion of the anchor bolt elongate shank.

7. The combination according to claim 2 wherein the at least one surface/edge on the cap support assembly faces in one axial direction and the at least one surface/edge on the cap faces axially oppositely to the one axial direction in a second axial direction, the cap and cap support assembly configured so that with the cap and cap support assembly in a pre-assembly angular orientation and fully axially spaced from each other, the cap can be advanced in the first axial direction to cause the at least one surface/edge on the cap to move axially up to and past the at least one surface/edge on the cap support assembly, whereupon the cap can be turned relative to the cap support assembly to place the at least one surface/edge on the cap in confronting relationship with the at least one surface/edge on the cap support assembly.

8. The combination according to claim 7 wherein the at least one of the cap and cap support assembly has a circumferential gap through which the at least one surface/edge on the other of the cap and cap support assembly moves with the cap and cap support assembly in the pre-assembly angular orientation and fully spaced from each other to allow the cap to be advanced in the first axial direction and the at least one surface/edge on the cap to move axially up to and axially past the surface/edge on the cap support assembly.

9. The combination according to claim 7 wherein the at least one surface/edge on one of the cap and cap support assembly has a detent part that engages the at least one surface/edge on the other of the cap support assembly to generate a frictional engagement force as the cap is turned relative to the cap support assembly to place the at least one surface/edge on the cap in confronting relationship with the at least one surface/edge on the cap support assembly.

10. The combination according to claim 7 wherein the cap is turned around the anchor bolt shank lengthwise axis in a first direction to place the at least one surface/edge on the cap in confronting relationship with the at least one surface/edge on the cap support assembly and there is a detent arrangement defined between the cap and cap support assembly that dictates a degree of resistance to turning of the cap in the second direction around the anchor bolt shank lengthwise axis after the cap is turned around the anchor bolt shank lengthwise axis in the first direction to place the at least one surface/edge on the cap in confronting relationship with the at least one surface/edge on the cap support assembly.

11. The combination according to claim 1 wherein the anchor bolt head portion has a flat, axially facing surface that bears against the closet collar flange to prevent the anchor bolt from being drawn axially upwardly and to away from the closet collar flange with the anchor bolt operatively connected to the closet collar, the closet collar elongate shank has an outer surface with a diameter, and the anchor bolt head portion having a transition region between a proximal end of the anchor bolt elongate shank and the flat surface that is radially enlarged with respect to the proximal end of the anchor bolt elongate shank, the transition region extending to above the closet collar flange.

12. The combination according to claim 11 wherein the anchor bolt elongate shank and head portion are made from a non-metal material and further in combination with a stabilizing component that is threadably engaged with the anchor bolt adjacent the transition region so that the flange can be captively maintained between the stabilizing component and the anchor bolt head, wherein the stabilizing component surrounds a portion of the transition region.

13. The combination according to claim 1 wherein the anchor bolt head portion has a flat, axially facing surface that bears against the closet collar flange to prevent the anchor bolt from being drawn upwardly and to away from the closet collar flange with the anchor bolt operatively connected to the closet collar, wherein the anchor bolt comprises first and second joinable parts, the first joinable part defining at least a part of the anchor bolt elongate shank and the second joinable part defining the flat axially facing surface on the anchor bolt head portion.

14. The combination according to claim 13 wherein the first and second parts are threadably joined together, the first joinable part defining an axially facing surface/edge and configured so that by relatively turning the threadably joined first and second joinable parts, the closet collar flange can be captured between the anchor bolt head portion and axially facing surface/edge on the first joinable part so as to stabilize the anchor bolt relative to the closet collar flange.

15. The combination according to claim 13 wherein the first joinable part is made from a non-metal material and the second joinable part is made from a metal material.

16. The combination according to claim 13 wherein the first and second joinable parts are threadably engageable, each with the other.

17. The combination according to claim 13 wherein the anchor bolt elongate shank has a stepped outer diameter with a first lengthwise portion having a first diameter and a second lengthwise portion having a second diameter that is less than the first diameter and the first lengthwise portion is closer to the anchor bolt head portion than the second lengthwise portion.

18. The combination according to claim 1 wherein the cap defines a receptacle with a volume and with the cap in the assembled relationship with the cap support assembly at least a part of the cap support assembly is extended into the volume of the cap receptacle.

19. The combination according to claim 1 further in combination with a toilet having a mounting portion and wherein: a) the closet collar is fixed with respect to a support for the toilet; b) the anchor bolt elongate shank extends into a through opening in the mounting portion of the toilet; c) the cap support assembly is engaged with the anchor bolt elongate shank adjacent the free end region of the anchor bolt elongate shank; and d) the cap is in assembled relationship with the cap support assembly.

20. The combination according to claim 19 wherein at least a portion of the anchor bolt elongate shank is made from a non-metal material that projects above the mounting portion of the toilet and further in combination with a cutting tool comprising an elongate flexible element having a portion configured to be wrapped against the anchor bolt elongate shank and moved back and forth against the anchor bolt elongate shank to progressively abrade the non-metal material to sever the anchor bolt elongate shank and separate a discrete length thereof and re-define the free end region of the anchor bolt elongate shank.

21. The combination according to claim 20 wherein the elongate flexible element has a length and first and second gripping elements spaced along the length of the elongate flexible element and each engageable by a hand of a user to allow the user to draw the portion of the elongate flexible element back and forth against the anchor bolt elongate shank.

22. The combination according to claim 19 wherein the nut assembly body is threadably engaged with the anchor bolt elongate shank so that the mounting portion of the toilet is captured relative to a support surface for the toilet.

23. The combination according to claim 1 further in combination with a repair flange having a body with a top and bottom, the anchor bolt configured to be operatively connected to the repair flange such that with the anchor bolt operatively connected to the repair flange: a) at least a part of the anchor bolt elongate shaft projects to above the top of the repair flange body to allow the at least part of the anchor bolt elongate shank to be passed into an opening in a mounting portion of a toilet being mounted; and b) the anchor bolt head portion bears against the repair flange body to prevent the anchor bolt from being drawn axially upwardly and to away from the repair flange body, whereby the anchor bolt can be selectively operatively connected to one or the other of the closet collar and repair flange to cooperate with the cap support assembly in a same fashion.

24. The combination according to claim 23 wherein the repair flange comprises a sealing component that is fixed at the bottom of the repair flange body to seal between the repair flange body and top of the closet collar flange with the repair flange connected to the closet collar.

25. The combination according to claim 24 wherein the repair flange body has an opening bounded by an edge and with the anchor bolt operatively connected to the repair flange the anchor bolt is keyed to the edge to limit turning of the anchor bolt relative to the repair flange body around the lengthwise axis of the anchor bolt elongate shank.

26. The combination according to claim 25 wherein the anchor bolt has a head piece that is keyed to the repair flange body to limit turning of the anchor bolt relative to the repair flange body around the lengthwise axis of the anchor bolt elongate shank.

27. In combination:
a closet collar having a flange with a top and bottom and configured to be anchored relative to a support surface upon which a toilet is to be mounted;
an anchor bolt having a head portion and an elongate shank,
the anchor bolt elongate shank extending away from the anchor bolt head portion and having a lengthwise axis,
the anchor bolt configured to be operatively connected to the closet collar,
the anchor bolt and closet collar configured so that with the anchor bolt operatively connected to the closet collar: a) at least a part of the anchor bolt elongate shank projects to above the top of the closet collar flange to allow the at least part of the anchor bolt elongate shank to be passed into an opening in a mounting portion of a toilet being mounted; and b) the anchor bolt head portion bears against the closet collar flange to prevent the anchor bolt from being drawn axially upwardly and to away from the closet collar flange;
a cap support assembly that is engageable with the anchor bolt elongate shank adjacent a free end region of the anchor bolt elongate shank; and
a cap,
there being cooperating components on the cap and cap support assembly that are engageable to maintain the cap in assembled relationship with the cap support assembly, wherein the cap cannot be separated from the cap support assembly by exerting a force upon the cap along the lengthwise axis of the anchor bolt elongate shank,
the cap support assembly and anchor bolt configured to cooperate so that at least part of the cap support assembly can be maintained in a plurality of different positions along the lengthwise axis of the anchor bolt elongate shank,
wherein the anchor bolt elongate shank has a threaded length,
wherein the cap has an axis that is substantially parallel to the lengthwise axis of the anchor bolt elongate shank with the cap support assembly engaged with the anchor bolt and the cap in assembled relationship with the cap support assembly,
the cap support assembly comprising a nut assembly that is threadably engageable with the threaded length of the anchor bolt elongate shank,
wherein the cooperating components on the cap and cap support assembly comprise at least one surface/edge on the cap that confronts at least one surface/edge on the cap support assembly to block movement of the cap axially away from the cap support assembly with the cap in assembled relationship with the cap support assembly,
wherein the nut assembly comprises a body with an axis and a radially projecting portion on which the at least one surface/edge on the cap support assembly is defined, the radially projecting portion having a radially outer edge that extends less than 90° around the body axis.

28. In combination according to claim 2:
a closet collar having a flange with a top and bottom and configured to be anchored relative to a support surface upon which a toilet is to be mounted;
an anchor bolt having a head portion and an elongate shank, the anchor bolt elongate shank extending away from the anchor bolt head portion and having a lengthwise axis, the anchor bolt configured to be operatively connected to the closet collar, the anchor bolt and closet collar configured so that with the anchor bolt operatively connected to the closet collar: a) at least a part of the anchor bolt elongate shank projects to above the top of the closet collar flange to allow the at least part of the anchor bolt elongate shank to be passed into an opening in a mounting portion of a toilet being mounted; and b) the anchor bolt head portion bears against the closet collar flange to prevent the anchor bolt from being drawn axially upwardly and to away from the closet collar flange;

a cap support assembly that is engageable with the anchor bolt elongate shank adjacent a free end region of the anchor bolt elongate shank; and a cap, there being cooperating components on the cap and cap support assembly that are engageable to maintain the cap in assembled relationship with the cap support assembly, wherein the cap cannot be separated from the cap support assembly by exerting a force upon the cap along the lengthwise axis of the anchor bolt elongate shank, the cap support assembly and anchor bolt configured to cooperate so that at least part of the cap support assembly can be maintained in a plurality of different positions along the lengthwise axis of the anchor bolt elongate shank, wherein the anchor bolt elongate shank has a threaded length, wherein the cap has an axis that is substantially parallel to the lengthwise axis of the anchor bolt elongate shank with the cap support assembly engaged with the anchor bolt and the cap in assembled relationship with the cap support assembly, the cap support assembly comprising a nut assembly that is threadably engageable with the threaded length of the anchor bolt elongate shank, wherein the cooperating components on the cap and cap support assembly comprise at least one surface/edge on the cap that confronts at least one surface/edge on the cap support assembly to block movement of the cap axially away from the cap support assembly with the cap in assembled relationship with the cap support assembly, wherein the nut assembly comprises a body with an axis, wherein the nut assembly body has radially oppositely projecting first and second portions and the at least one surface/edge on the cap support assembly comprises first and second surfaces/edges respectively on the radially oppositely projecting first and second body portions.

29. The combination according to claim 28 wherein the nut assembly body has first and second concave surfaces that open radially oppositely to facilitate grasping of the head between fingers on a user's hand.

30. The combination according to claim 28 wherein the nut assembly body is threadably engaged with the anchor bolt elongate shank, wherein the at least one surface/edge on the nut assembly body comprises at least one surface/edge on the nut assembly body facing one axial direction and at least one surface/edge on the nut assembly body facing oppositely to the one axial direction, the nut assembly body threadably engageable with the anchor bolt shank in a first orientation and in an inverted orientation to allow the at least one surface/edge on the nut assembly body to cooperate with the at least one surface/edge on the cap.

31. In combination:

a closet collar having a flange with a top and bottom and configured to be anchored relative to a support surface upon which a toilet is to be mounted;

an anchor bolt having a head portion and an elongate shank, the anchor bolt elongate shank extending away from the anchor bolt head portion and having a lengthwise axis, the anchor bolt configured to be operatively connected to the closet collar, the anchor bolt and closet collar configured so that with the anchor bolt operatively connected to the closet collar: a) at least a part of the anchor bolt elongate shank projects to above the top of the closet collar flange to allow the at least part of the anchor bolt elongate shank to be passed into an opening in a mounting portion of a toilet being mounted; and b) the anchor bolt head portion bears against the closet collar flange to prevent the anchor bolt from being drawn axially upwardly and to away from the closet collar flange;

a cap support assembly that is engageable with the anchor bolt elongate shank adjacent a free end region of the anchor bolt elongate shank; and a cap, there being cooperating components on the cap and cap support assembly that are engageable to maintain the cap in assembled relationship with the cap support assembly, wherein the cap cannot be separated from the cap support assembly by exerting a force upon the cap along the lengthwise axis of the anchor bolt elongate shank, the cap support assembly and anchor bolt configured to cooperate so that at least part of the cap support assembly can be maintained in a plurality of different positions along the lengthwise axis of the anchor bolt elongate shank, wherein the anchor bolt elongate shank has a threaded length, wherein the cap has an axis that is substantially parallel to the lengthwise axis of the anchor bolt elongate shank with the cap support assembly engaged with the anchor bolt and the cap in assembled relationship with the cap support assembly, the cap support assembly comprising a nut assembly that is threadably engageable with the threaded length of the anchor bolt elongate shank, wherein the cooperating components on the cap and cap support assembly comprise at least one surface/edge on the cap that confronts at least one surface/edge on the cap support assembly to block movement of the cap axially away from the cap support assembly with the cap in assembled relationship with the cap support assembly, wherein the at least one surface/edge on the cap support assembly faces in one axial direction and the at least one surface/edge on the cap faces axially oppositely to the one axial direction in a second axial direction, the cap and cap support assembly configured so that with the cap and cap support assembly in a pre-assembly angular orientation and fully axially spaced from each other, the cap can be advanced in the first axial direction to cause the at least one surface/edge on the cap to move axially up to and past the at least one surface/ edge on the cap support assembly, whereupon the cap can be turned relative to the cap support assembly to place the at least one surface/edge on the cap in confronting relationship with the at least one surface/edge on the cap support assembly, wherein the nut assembly comprises a body, the cap has a cup-shaped configuration with an axis, a top wall and a peripheral wall extending around the axis of the cap, the cap having a portion depending from the top wall of the cap, spaced radially inwardly from the peripheral wall of the cap, and defining an edge that is guided against the nut assembly body as the cap is turned relative to the cap support assembly to place the at least one surface/edge on the cap in confronting relationship with the at least one surface/edge on the cap support assembly.

32. A method of mounting a toilet to a support surface, the method comprising the steps of:

a) obtaining a combination comprising:

a closet collar having a flange with a top and bottom and configured to be anchored relative to a support surface upon which a toilet is to be mounted;

an anchor bolt having a head portion and an elongate shank, the anchor bolt elongate shank extending away from the anchor bolt head portion and having a lengthwise axis, the anchor bolt configured to be operatively connected to the closet collar, the anchor bolt and closet collar configured so that with the anchor bolt operatively connected to the closet collar: a) at least a part of the anchor bolt elongate shank projects to above the top of the closet collar flange to allow the at least part of the anchor bolt elongate shank to be passed into an opening in a mounting portion of a toilet being mounted; and b) the anchor bolt head portion bears against the closet collar flange to prevent the anchor bolt from being drawn axially upwardly and to away from the closet collar flange;

a cap support assembly that is engageable with the anchor bolt elongate shank adjacent a free end region of the anchor bolt elongate shank; and a cap, there being cooperating components on the cap and cap support assembly that are engageable to maintain the cap in assembled relationship with the cap support assembly, wherein the cap cannot be separated from the cap support assembly by exerting a force upon the cap along the lengthwise axis of the anchor bolt elongate shank, the cap support assembly and anchor bolt configured to cooperate so that at least part of the cap support assembly can be maintained in a plurality of different positions along the lengthwise axis of the anchor bolt elongate shank, wherein the anchor bolt elongate shank has a threaded length, wherein the cap has an axis that is substantially parallel to the lengthwise axis of the anchor bolt elongate shank with the cap support assembly engaged with the anchor bolt and the cap in assembled relationship with the cap support assembly, the cap support assembly comprising a nut assembly that is threadably engageable with the threaded length of the anchor bolt elongate shank, wherein the cooperating components on the cap and cap support assembly comprise at least one surface/edge on the cap that confronts at least one surface/edge on the cap support assembly to block movement of the cap axially away from the cap support assembly with the cap in assembled relationship with the cap support assembly;

b) operatively connecting the anchor bolt to the closet collar;

c) anchoring the closet collar relative to the support surface;

d) placing the toilet on the support surface so that the anchor bolt elongate shank is directed upwardly into a through opening on a mounting portion of the toilet so that the free end region of the anchor bolt elongate shank projects to above a top surface of the mounting portion of the toilet;

e) threadably engaging the nut assembly body with the free end region of the anchor bolt elongate shank and thereby causing the nut assembly body to directly or indirectly exert an axial force on the top surface of the mounting portion of the toilet, to thereby place the nut assembly body in a fully connected position; and f) with the nut assembly body in a fully connected position, placing the cap in the fully assembled relationship with the cap support assembly, wherein the step of placing the cap in the fully assembled relationship comprises axially advancing the cap up to and into axially overlapping relationship with the nut assembly body and thereafter turning the cap relative to the nut assembly body through less than 360° to thereby engage the cooperating components on the cap and cap support assembly.

33. The method of mounting a toilet to a support surface according to claim 32 wherein the cooperating components on the cap and cap support assembly comprise at least one surface/edge on the cap that confronts at least one surface/edge on the cap support assembly to block movement of the cap axially away from the cap support assembly with the cap in the fully assembled relationship.

* * * * *